(12) United States Patent
Putman et al.

(10) Patent No.: US 12,120,131 B2
(45) Date of Patent: Oct. 15, 2024

(54) DYNAMIC MONITORING AND SECURING OF FACTORY PROCESSES, EQUIPMENT AND AUTOMATED SYSTEMS

(71) Applicant: Nanotronics Imaging, Inc., Cuyahoga Falls, OH (US)

(72) Inventors: Matthew C. Putman, Brooklyn, NY (US); John B. Putman, Celebration, FL (US); Vadim Pinskiy, Wayne, NJ (US); Damas Limoge, Brooklyn, NY (US); Andrew Sundstrom, Brooklyn, NY (US); James Williams, III, New York, NY (US)

(73) Assignee: Nanotronics Imaging, Inc., Cuyahoga Falls, OH (US)

( * ) Notice: Subject to any disclaimer, the term of this patent is extended or adjusted under 35 U.S.C. 154(b) by 0 days.

(21) Appl. No.: 17/304,614

(22) Filed: Jun. 23, 2021

(65) Prior Publication Data

US 2021/0320931 A1 Oct. 14, 2021

Related U.S. Application Data

(63) Continuation of application No. 16/781,193, filed on Feb. 4, 2020, now Pat. No. 11,063,965.

(Continued)

(51) Int. Cl.
*G05B 19/4155* (2006.01)
*G06N 3/08* (2023.01)
*H04L 9/40* (2022.01)

(52) U.S. Cl.
CPC ...... *H04L 63/1416* (2013.01); *G05B 19/4155* (2013.01); *G06N 3/08* (2013.01); *G05B 2219/31372* (2013.01)

(58) Field of Classification Search
CPC ............ G05B 13/0265; G05B 19/4155; G05B 19/418; G05B 2219/31372;
(Continued)

(56) References Cited

U.S. PATENT DOCUMENTS 4,056,716 A 11/1977 Baxter et al.
4,433,385 A 2/1984 De Gasperi et al.
(Continued)

FOREIGN PATENT DOCUMENTS

AU 2002359881 A1 7/2003
CN 1371489 9/2002
(Continued)

OTHER PUBLICATIONS

PCT International Application No. PCT/US20/52254. International Search Report and Written Opinion of the International Searching Authority, dated Jan. 12, 2021, 8 pages.
(Continued)

*Primary Examiner* — Yuhui R Pan
(74) *Attorney, Agent, or Firm* — DLA PIPER LLP (US)

(57) ABSTRACT

A system including a deep learning processor obtains response data of at least two data types from a set of process stations performing operations as part of a manufacturing process. The system analyzes factory operation and control data to generate expected behavioral pattern data. Further, the system uses the response data to generate actual behavior pattern data for the process stations. Based on an analysis of the actual behavior pattern data in relation to the expected behavioral pattern data, the system determines whether anomalous activity has occurred as a result of the manufacturing process. If it is determined that anomalous activity has occurred, the system provides an indication of this anomalous activity.

20 Claims, 6 Drawing Sheets

Related U.S. Application Data

(60) Provisional application No. 62/950,588, filed on Dec. 19, 2019.

(58) Field of Classification Search
CPC ...... G05B 2219/33034; G05B 23/0224; G06F 21/554; G06F 21/566; H04L 63/1416; H04L 63/1441; H04L 67/125; G06N 3/08; Y02P 90/02
See application file for complete search history.

(56) References Cited

U.S. PATENT DOCUMENTS

| | | |
|---|---|---|
| 5,027,295 A | 6/1991 | Yotsuya |
| 5,808,432 A | 9/1998 | Inoue et al. |
| 5,815,198 A | 9/1998 | Vachtsevanos et al. |
| 6,240,633 B1 | 6/2001 | Kent et al. |
| 6,266,436 B1 | 7/2001 | Bett et al. |
| 6,650,779 B2 | 11/2003 | Vachtesvanos et al. |
| 6,757,571 B1 | 6/2004 | Toyama |
| 7,149,337 B2 | 12/2006 | Michaelis et al. |
| 7,551,274 B1 | 6/2009 | Wornson et al. |
| 8,185,217 B2 | 5/2012 | Thiele |
| 8,612,043 B2 | 12/2013 | Moyne et al. |
| 8,909,926 B2 | 12/2014 | Brandt et al. |
| 9,945,264 B2 | 4/2018 | Wichmann et al. |
| 9,977,425 B1 | 5/2018 | McCann et al. |
| 10,061,300 B1 | 8/2018 | Coffman et al. |
| 10,102,495 B1 | 10/2018 | Zhang et al. |
| 10,481,579 B1 | 11/2019 | Putman et al. |
| 11,117,328 B2 | 9/2021 | Hough et al. |
| 11,156,982 B2 | 10/2021 | Putman et al. |
| 11,156,991 B2 | 10/2021 | Putman et al. |
| 11,156,992 B2 | 10/2021 | Putman et al. |
| 11,209,795 B2 | 12/2021 | Putman et al. |
| 11,675,330 B2 | 6/2023 | Putman et al. |
| 2002/0002414 A1 | 1/2002 | Hsiung et al. |
| 2002/0143417 A1 | 10/2002 | Ito et al. |
| 2003/0061004 A1 | 3/2003 | Discenzo |
| 2004/0030431 A1 | 2/2004 | Popp et al. |
| 2004/0070509 A1 | 4/2004 | Grace et al. |
| 2005/0267607 A1 | 12/2005 | Paik |
| 2006/0013505 A1 | 1/2006 | Yau et al. |
| 2006/0058898 A1 | 3/2006 | Emigholz et al. |
| 2006/0149407 A1 | 7/2006 | Markham et al. |
| 2007/0005525 A1 | 1/2007 | Collette, III et al. |
| 2007/0036421 A1 | 2/2007 | Toba et al. |
| 2007/0047797 A1 | 3/2007 | Vilella |
| 2007/0177787 A1 | 8/2007 | Maeda et al. |
| 2008/0100570 A1 | 5/2008 | Friedrich et al. |
| 2008/0276128 A1* | 11/2008 | Lin .................. G05B 19/0428 714/45 |
| 2008/0300709 A1 | 12/2008 | Collette, III et al. |
| 2009/0158577 A1 | 6/2009 | Schweikle |
| 2009/0198464 A1 | 8/2009 | Clarke et al. |
| 2009/0242513 A1 | 10/2009 | Funk et al. |
| 2009/0281753 A1 | 11/2009 | Noy |
| 2010/0106458 A1* | 4/2010 | Leu .................. F04B 49/065 702/181 |
| 2010/0131202 A1 | 5/2010 | Dannevik et al. |
| 2011/0141265 A1 | 6/2011 | Holtkamp et al. |
| 2012/0151585 A1 | 6/2012 | Lamastra et al. |
| 2012/0304007 A1 | 11/2012 | Hanks et al. |
| 2013/0031037 A1 | 1/2013 | Brandt et al. |
| 2013/0339919 A1 | 12/2013 | Baseman et al. |
| 2014/0082730 A1 | 3/2014 | Vashist et al. |
| 2014/0247347 A1 | 9/2014 | McNeill et al. |
| 2014/0336785 A1 | 11/2014 | Asenjo et al. |
| 2015/0045928 A1 | 2/2015 | Perez et al. |
| 2015/0067844 A1 | 3/2015 | Brandt et al. |
| 2015/0096022 A1 | 4/2015 | Vincent et al. |
| 2015/0184549 A1 | 7/2015 | Pamujula et al. |
| 2015/0185716 A1 | 7/2015 | Wichmann et al. |
| 2015/0213369 A1 | 7/2015 | Brandt et al. |
| 2015/0286202 A1 | 10/2015 | Amano et al. |
| 2015/0324329 A1 | 11/2015 | Blevins et al. |
| 2016/0170996 A1 | 6/2016 | Frank et al. |
| 2016/0253618 A1 | 9/2016 | Imazawa et al. |
| 2016/0259318 A1 | 9/2016 | Vogt et al. |
| 2016/0261465 A1 | 9/2016 | Gupta et al. |
| 2016/0300338 A1 | 10/2016 | Zafar et al. |
| 2016/0330222 A1 | 11/2016 | Brandt et al. |
| 2016/0352762 A1 | 12/2016 | Friedlander et al. |
| 2017/0034205 A1 | 2/2017 | Canedo et al. |
| 2017/0093897 A1 | 3/2017 | Cochin et al. |
| 2017/0102694 A1 | 4/2017 | Enver et al. |
| 2017/0102696 A1 | 4/2017 | Bell et al. |
| 2017/0109646 A1 | 4/2017 | David |
| 2017/0149820 A1 | 5/2017 | Ruvio et al. |
| 2017/0156674 A1 | 6/2017 | Hochman |
| 2017/0169219 A1 | 6/2017 | Ogawa et al. |
| 2017/0255723 A1 | 9/2017 | Asenjo et al. |
| 2017/0264629 A1 | 9/2017 | Wei et al. |
| 2018/0005083 A1 | 1/2018 | Georgescu et al. |
| 2018/0033130 A1 | 2/2018 | Kimura et al. |
| 2018/0079125 A1 | 3/2018 | Perez et al. |
| 2018/0114121 A1 | 4/2018 | Rana et al. |
| 2018/0144248 A1 | 5/2018 | Lu et al. |
| 2018/0150070 A1 | 5/2018 | Johnson et al. |
| 2018/0157831 A1 | 6/2018 | Abbaszadeh et al. |
| 2018/0165602 A1 | 6/2018 | Van Seijen et al. |
| 2018/0180085 A1 | 6/2018 | Watanabe et al. |
| 2018/0188704 A1 | 7/2018 | Cella et al. |
| 2018/0188714 A1 | 7/2018 | Cella et al. |
| 2018/0188715 A1 | 7/2018 | Cella et al. |
| 2018/0210425 A1 | 7/2018 | Cella et al. |
| 2018/0210426 A1 | 7/2018 | Cella et al. |
| 2018/0210427 A1 | 7/2018 | Cella et al. |
| 2018/0248905 A1 | 8/2018 | Côté et al. |
| 2018/0253073 A1 | 9/2018 | Cella et al. |
| 2018/0253074 A1 | 9/2018 | Cella et al. |
| 2018/0253075 A1 | 9/2018 | Cella et al. |
| 2018/0253082 A1 | 9/2018 | Asenjo et al. |
| 2018/0255374 A1 | 9/2018 | Cella et al. |
| 2018/0255375 A1 | 9/2018 | Cella et al. |
| 2018/0255376 A1 | 9/2018 | Cella et al. |
| 2018/0255377 A1 | 9/2018 | Cella et al. |
| 2018/0255378 A1 | 9/2018 | Cella et al. |
| 2018/0255379 A1 | 9/2018 | Cella et al. |
| 2018/0255380 A1 | 9/2018 | Cella et al. |
| 2018/0255381 A1 | 9/2018 | Cella et al. |
| 2018/0255382 A1 | 9/2018 | Cella et al. |
| 2018/0255383 A1 | 9/2018 | Cella et al. |
| 2018/0262528 A1 | 9/2018 | Jain |
| 2018/0276375 A1 | 9/2018 | Arov et al. |
| 2018/0284735 A1 | 10/2018 | Cella et al. |
| 2018/0284736 A1 | 10/2018 | Cella et al. |
| 2018/0284737 A1 | 10/2018 | Cella et al. |
| 2018/0284741 A1 | 10/2018 | Cella et al. |
| 2018/0284742 A1 | 10/2018 | Cella et al. |
| 2018/0284743 A1 | 10/2018 | Cella et al. |
| 2018/0284744 A1 | 10/2018 | Cella et al. |
| 2018/0284745 A1 | 10/2018 | Cella et al. |
| 2018/0284746 A1 | 10/2018 | Cella et al. |
| 2018/0284747 A1 | 10/2018 | Cella et al. |
| 2018/0284749 A1 | 10/2018 | Cella et al. |
| 2018/0284752 A1 | 10/2018 | Cella et al. |
| 2018/0284753 A1 | 10/2018 | Cella et al. |
| 2018/0284754 A1 | 10/2018 | Cella et al. |
| 2018/0284755 A1 | 10/2018 | Cella et al. |
| 2018/0284756 A1 | 10/2018 | Cella et al. |
| 2018/0284757 A1 | 10/2018 | Cella et al. |
| 2018/0284758 A1 | 10/2018 | Cella et al. |
| 2018/0292811 A1 | 10/2018 | Baseman et al. |
| 2018/0292812 A1 | 10/2018 | Baseman et al. |
| 2018/0299878 A1 | 10/2018 | Cella et al. |
| 2018/0316719 A1 | 11/2018 | Schneider et al. |
| 2018/0321666 A1 | 11/2018 | Cella et al. |
| 2018/0321667 A1 | 11/2018 | Cella et al. |
| 2018/0321672 A1 | 11/2018 | Cella et al. |
| 2018/0358271 A1 | 12/2018 | David |
| 2018/0367550 A1 | 12/2018 | Musuvathi et al. |
| 2018/0376067 A1 | 12/2018 | Martineau |
| 2019/0020669 A1 | 1/2019 | Glatfelter et al. |

(56) References Cited

U.S. PATENT DOCUMENTS

| | | |
|---|---|---|
| 2019/0025805 A1 | 1/2019 | Cella et al. |
| 2019/0025806 A1 | 1/2019 | Cella et al. |
| 2019/0025812 A1 | 1/2019 | Cella et al. |
| 2019/0033845 A1 | 1/2019 | Cella et al. |
| 2019/0033846 A1 | 1/2019 | Cella et al. |
| 2019/0033847 A1 | 1/2019 | Cella et al. |
| 2019/0033848 A1 | 1/2019 | Cella et al. |
| 2019/0033849 A1 | 1/2019 | Cella et al. |
| 2019/0041836 A1 | 2/2019 | Cella et al. |
| 2019/0041840 A1 | 2/2019 | Cella et al. |
| 2019/0041841 A1 | 2/2019 | Cella et al. |
| 2019/0041843 A1 | 2/2019 | Cella et al. |
| 2019/0041844 A1 | 2/2019 | Cella et al. |
| 2019/0041845 A1 | 2/2019 | Cella et al. |
| 2019/0041846 A1 | 2/2019 | Cella et al. |
| 2019/0064766 A1 | 2/2019 | Friebolin et al. |
| 2019/0064792 A1 | 2/2019 | Cella et al. |
| 2019/0068618 A1 | 2/2019 | Mestha et al. |
| 2019/0068620 A1 | 2/2019 | Avrahami et al. |
| 2019/0072922 A1 | 3/2019 | Cella et al. |
| 2019/0072923 A1 | 3/2019 | Cella et al. |
| 2019/0072924 A1 | 3/2019 | Cella et al. |
| 2019/0072925 A1 | 3/2019 | Cella et al. |
| 2019/0072926 A1 | 3/2019 | Cella et al. |
| 2019/0072928 A1 | 3/2019 | Cella et al. |
| 2019/0073585 A1 | 3/2019 | Pu et al. |
| 2019/0079483 A1 | 3/2019 | Cella et al. |
| 2019/0089722 A1 | 3/2019 | Ciocarlie et al. |
| 2019/0094829 A1 | 3/2019 | Cella et al. |
| 2019/0094842 A1 | 3/2019 | Lee et al. |
| 2019/0094843 A1 | 3/2019 | Lee et al. |
| 2019/0104138 A1 | 4/2019 | Storms et al. |
| 2019/0107816 A1 | 4/2019 | Cella et al. |
| 2019/0114756 A1 | 4/2019 | Weiss et al. |
| 2019/0118300 A1 | 4/2019 | Penny et al. |
| 2019/0121339 A1 | 4/2019 | Cella et al. |
| 2019/0121340 A1 | 4/2019 | Cella et al. |
| 2019/0121342 A1 | 4/2019 | Cella et al. |
| 2019/0121343 A1 | 4/2019 | Cella et al. |
| 2019/0121344 A1 | 4/2019 | Cella et al. |
| 2019/0121345 A1 | 4/2019 | Cella et al. |
| 2019/0121346 A1 | 4/2019 | Cella et al. |
| 2019/0121347 A1 | 4/2019 | Cella et al. |
| 2019/0121349 A1 | 4/2019 | Cella et al. |
| 2019/0129404 A1 | 5/2019 | Cella et al. |
| 2019/0129405 A1 | 5/2019 | Cella et al. |
| 2019/0129406 A1 | 5/2019 | Cella et al. |
| 2019/0129408 A1 | 5/2019 | Cella et al. |
| 2019/0129409 A1 | 5/2019 | Cella et al. |
| 2019/0137985 A1 | 5/2019 | Cella et al. |
| 2019/0137987 A1 | 5/2019 | Cella et al. |
| 2019/0137988 A1 | 5/2019 | Cella et al. |
| 2019/0137989 A1 | 5/2019 | Cella et al. |
| 2019/0138897 A1 | 5/2019 | Xu et al. |
| 2019/0138932 A1 | 5/2019 | Akella et al. |
| 2019/0146474 A1 | 5/2019 | Cella et al. |
| 2019/0146476 A1 | 5/2019 | Cella et al. |
| 2019/0146477 A1 | 5/2019 | Cella et al. |
| 2019/0146481 A1 | 5/2019 | Cella et al. |
| 2019/0146482 A1 | 5/2019 | Cella et al. |
| 2019/0155272 A1 | 5/2019 | Cella et al. |
| 2019/0179277 A1 | 6/2019 | Cella et al. |
| 2019/0179278 A1 | 6/2019 | Cella et al. |
| 2019/0179279 A1 | 6/2019 | Cella et al. |
| 2019/0179300 A1 | 6/2019 | Cella et al. |
| 2019/0179301 A1 | 6/2019 | Cella et al. |
| 2019/0180153 A1 | 6/2019 | Buckler et al. |
| 2019/0187646 A1 | 6/2019 | Cella et al. |
| 2019/0187647 A1 | 6/2019 | Cella et al. |
| 2019/0187648 A1 | 6/2019 | Cella et al. |
| 2019/0187649 A1 | 6/2019 | Cella et al. |
| 2019/0187650 A1 | 6/2019 | Cella et al. |
| 2019/0187651 A1 | 6/2019 | Cella et al. |
| 2019/0187652 A1 | 6/2019 | Cella et al. |
| 2019/0187653 A1 | 6/2019 | Cella et al. |
| 2019/0187654 A1 | 6/2019 | Cella et al. |
| 2019/0187655 A1 | 6/2019 | Cella et al. |
| 2019/0187656 A1 | 6/2019 | Cella et al. |
| 2019/0187657 A1 | 6/2019 | Cella et al. |
| 2019/0187680 A1 | 6/2019 | Cella et al. |
| 2019/0187681 A1 | 6/2019 | Cella et al. |
| 2019/0187682 A1 | 6/2019 | Cella et al. |
| 2019/0187683 A1 | 6/2019 | Cella et al. |
| 2019/0187684 A1 | 6/2019 | Cella et al. |
| 2019/0187685 A1 | 6/2019 | Cella et al. |
| 2019/0187686 A1 | 6/2019 | Cella et al. |
| 2019/0187687 A1 | 6/2019 | Cella et al. |
| 2019/0187688 A1 | 6/2019 | Cella et al. |
| 2019/0187689 A1 | 6/2019 | Cella et al. |
| 2019/0187690 A1 | 6/2019 | Cella et al. |
| 2019/0197236 A1 | 6/2019 | Niculescu-Mizil et al. |
| 2019/0213099 A1 | 7/2019 | Schmidt et al. |
| 2019/0219995 A1 | 7/2019 | Cella et al. |
| 2019/0219996 A1 | 7/2019 | Cella et al. |
| 2019/0227536 A1 | 7/2019 | Cella et al. |
| 2019/0227537 A1 | 7/2019 | Cella et al. |
| 2019/0230099 A1 | 7/2019 | Mestha et al. |
| 2019/0230106 A1 | 7/2019 | Abbaszadeh et al. |
| 2019/0235461 A1 | 8/2019 | Cella et al. |
| 2019/0235462 A1 | 8/2019 | Cella et al. |
| 2019/0238568 A1 | 8/2019 | Goswami et al. |
| 2019/0243323 A1 | 8/2019 | Cella et al. |
| 2019/0243346 A1 | 8/2019 | Baseman et al. |
| 2019/0286111 A1* | 9/2019 | Yennie .............. H01L 21/67092 |
| 2019/0286892 A1 | 9/2019 | Li et al. |
| 2019/0294869 A1 | 9/2019 | Naphade et al. |
| 2019/0295887 A1 | 9/2019 | Trickett et al. |
| 2019/0295890 A1 | 9/2019 | Clark et al. |
| 2019/0295891 A1 | 9/2019 | Clark et al. |
| 2019/0295906 A1 | 9/2019 | Clark et al. |
| 2019/0299536 A1 | 10/2019 | Putman et al. |
| 2019/0302707 A1 | 10/2019 | Guo et al. |
| 2019/0339684 A1 | 11/2019 | Cella et al. |
| 2019/0339685 A1 | 11/2019 | Cella et al. |
| 2019/0339686 A1 | 11/2019 | Cella et al. |
| 2019/0339687 A1 | 11/2019 | Cella et al. |
| 2019/0362480 A1 | 11/2019 | Diao et al. |
| 2019/0379677 A1 | 12/2019 | Zenz et al. |
| 2019/0384250 A1 | 12/2019 | Cella et al. |
| 2019/0386595 A1 | 12/2019 | Fujita et al. |
| 2019/0391550 A1 | 12/2019 | Cella et al. |
| 2019/0391551 A1 | 12/2019 | Cella et al. |
| 2019/0391552 A1 | 12/2019 | Cella et al. |
| 2020/0012248 A1 | 1/2020 | Cella et al. |
| 2020/0013156 A1 | 1/2020 | Weiss et al. |
| 2020/0019154 A1 | 1/2020 | Cella et al. |
| 2020/0019155 A1 | 1/2020 | Cella et al. |
| 2020/0026270 A1 | 1/2020 | Cella et al. |
| 2020/0076838 A1 | 3/2020 | Mestha et al. |
| 2020/0081423 A1 | 3/2020 | Clark et al. |
| 2020/0083070 A1 | 3/2020 | Clark et al. |
| 2020/0083074 A1 | 3/2020 | Clark et al. |
| 2020/0083080 A1 | 3/2020 | Clark et al. |
| 2020/0096986 A1 | 3/2020 | Cella et al. |
| 2020/0096987 A1 | 3/2020 | Cella et al. |
| 2020/0096988 A1 | 3/2020 | Cella et al. |
| 2020/0096989 A1 | 3/2020 | Cella et al. |
| 2020/0096990 A1 | 3/2020 | Cella et al. |
| 2020/0096992 A1 | 3/2020 | Cella et al. |
| 2020/0096993 A1 | 3/2020 | Cella et al. |
| 2020/0096994 A1 | 3/2020 | Cella et al. |
| 2020/0096995 A1 | 3/2020 | Cella et al. |
| 2020/0096996 A1 | 3/2020 | Cella et al. |
| 2020/0096997 A1 | 3/2020 | Cella et al. |
| 2020/0096998 A1 | 3/2020 | Cella et al. |
| 2020/0099707 A1 | 3/2020 | Abbaszadeh et al. |
| 2020/0103890 A1 | 4/2020 | Cella et al. |
| 2020/0103891 A1 | 4/2020 | Cella et al. |
| 2020/0103892 A1 | 4/2020 | Cella et al. |
| 2020/0103893 A1 | 4/2020 | Cella et al. |
| 2020/0110398 A1 | 4/2020 | Cella et al. |
| 2020/0110399 A1 | 4/2020 | Cella et al. |
| 2020/0110400 A1 | 4/2020 | Cella et al. |
| 2020/0110401 A1 | 4/2020 | Cella et al. |

(56) References Cited

U.S. PATENT DOCUMENTS

| | | |
|---|---|---|
| 2020/0111689 A1 | 4/2020 | Banna et al. |
| 2020/0117180 A1 | 4/2020 | Cella et al. |
| 2020/0125978 A1 | 4/2020 | Abbaszadeh et al. |
| 2020/0166909 A1 | 5/2020 | Noone et al. |
| 2020/0175171 A1 | 6/2020 | Rieger et al. |
| 2020/0310380 A1 | 10/2020 | Sun et al. |
| 2020/0314128 A1 | 10/2020 | Hild |
| 2020/0333777 A1 | 10/2020 | Maruyama |
| 2020/0401120 A1 | 12/2020 | Putman et al. |
| 2021/0069990 A1 | 3/2021 | Hough et al. |
| 2021/0118730 A1 | 4/2021 | Clark et al. |
| 2021/0125863 A1 | 4/2021 | Clark et al. |
| 2021/0132593 A1 | 5/2021 | Sundstrom et al. |
| 2021/0138735 A1 | 5/2021 | Limoge et al. |
| 2021/0168976 A1 | 6/2021 | Kawai et al. |
| 2021/0192779 A1 | 6/2021 | Putman et al. |
| 2021/0263495 A1 | 8/2021 | Putman et al. |
| 2021/0311440 A1 | 10/2021 | Sundstrom et al. |
| 2021/0378190 A1 | 12/2021 | Limoge et al. |
| 2021/0394456 A1 | 12/2021 | Hough et al. |
| 2022/0011727 A1 | 1/2022 | Hlavac et al. |
| 2022/0236709 A1 | 7/2022 | Cella et al. |
| 2022/0308653 A1 | 9/2022 | Pu et al. |
| 2023/0182235 A1 | 6/2023 | Penny et al. |

FOREIGN PATENT DOCUMENTS

| | | |
|---|---|---|
| CN | 1705938 A | 12/2005 |
| CN | 101771702 A | 7/2010 |
| CN | 102466566 A | 5/2012 |
| CN | 102778858 A | 11/2012 |
| CN | 103324175 | 9/2013 |
| CN | 104656602 | 5/2015 |
| CN | 105094030 | 11/2015 |
| CN | 105264640 | 1/2016 |
| CN | 105488806 A | 4/2016 |
| CN | 105960777 A | 9/2016 |
| CN | 106687981 A | 5/2017 |
| CN | 106857797 | 6/2017 |
| CN | 106921676 A | 7/2017 |
| CN | 107389701 | 11/2017 |
| CN | 107835982 A | 3/2018 |
| CN | 107851047 A | 3/2018 |
| CN | 107886500 | 4/2018 |
| CN | 107976969 A | 5/2018 |
| CN | 108353078 | 7/2018 |
| CN | 108604393 | 9/2018 |
| CN | 108780314 A | 11/2018 |
| CN | 108854446 | 11/2018 |
| CN | 109167796 | 1/2019 |
| CN | 109561112 | 4/2019 |
| CN | 109766992 | 5/2019 |
| CN | 110381045 | 10/2019 |
| CN | 110431503 | 11/2019 |
| CN | 110647414 A | 1/2020 |
| CN | 110851834 A | 2/2020 |
| EP | 0671677 | 3/1999 |
| EP | 2585248 B1 | 10/2017 |
| EP | 4028228 A1 | 7/2022 |
| JP | H05322789 | 12/1993 |
| JP | 2001100838 A | 4/2001 |
| JP | 2002230337 A | 8/2002 |
| JP | 2003167613 A | 6/2003 |
| JP | 2004104576 A | 4/2004 |
| JP | 2004178388 | 6/2004 |
| JP | 2005211105 A | 8/2005 |
| JP | 2005250990 A | 9/2005 |
| JP | 2007280366 A | 10/2007 |
| JP | 2008009868 A | 1/2008 |
| JP | 2008512792 A | 4/2008 |
| JP | 2008146621 A | 6/2008 |
| JP | 2009134623 A | 6/2009 |
| JP | 2009282740 | 12/2009 |
| JP | 4601492 | 12/2010 |
| JP | 4621773 B2 | 1/2011 |
| JP | 2015099022 A | 5/2015 |
| JP | 2015181024 A | 10/2015 |
| JP | 5984096 B2 | 9/2016 |
| JP | 2016157357 A | 9/2016 |
| JP | 2017091091 A | 5/2017 |
| JP | 6224873 B1 | 11/2017 |
| JP | 2017211713 A | 11/2017 |
| JP | 2018022210 A | 2/2018 |
| JP | 6356909 | 7/2018 |
| JP | 2018139101 A | 9/2018 |
| JP | 2019061565 A | 4/2019 |
| JP | 6527295 B2 | 6/2019 |
| JP | 2019095859 A | 6/2019 |
| JP | 2019145042 A | 8/2019 |
| JP | 2020035420 A | 3/2020 |
| JP | 2020114597 A | 7/2020 |
| JP | 2022522159 | 4/2022 |
| KR | 10-2011-0069934 | 6/2011 |
| KR | 10-2015-0075742 | 7/2015 |
| KR | 101568879 B1 | 11/2015 |
| KR | 10-2017-0127430 | 11/2017 |
| KR | 10-2019-0000182 | 1/2019 |
| TW | 454137 | 9/2001 |
| TW | 489443 | 6/2002 |
| TW | 200307972 | 12/2003 |
| TW | 200415453 | 8/2004 |
| TW | 200629117 | 8/2006 |
| TW | 200715080 A | 4/2007 |
| TW | 200724237 | 7/2007 |
| TW | 201212140 | 3/2012 |
| TW | I409658 B | 9/2013 |
| TW | 201339069 A | 10/2013 |
| TW | 201717144 | 5/2017 |
| TW | 201723914 A | 7/2017 |
| TW | 201809640 A | 3/2018 |
| TW | 201816717 | 5/2018 |
| TW | 201839626 A | 11/2018 |
| TW | 201842403 | 12/2018 |
| TW | 201908896 | 3/2019 |
| TW | 201939634 | 10/2019 |
| TW | 201941194 A | 10/2019 |
| TW | 201941328 A | 10/2019 |
| TW | 202001678 A | 1/2020 |
| WO | 2005093535 A3 | 11/2005 |
| WO | 2018044410 A1 | 3/2018 |
| WO | 2018055754 A1 | 3/2018 |
| WO | 2018061842 A1 | 4/2018 |
| WO | 2018062398 A1 | 4/2018 |
| WO | 2018105296 | 6/2018 |
| WO | 03/060812 | 11/2018 |
| WO | 2018217903 | 11/2018 |
| WO | 2019012653 A1 | 1/2019 |
| WO | 2019058532 A1 | 3/2019 |
| WO | 2019/182913 | 9/2019 |
| WO | 2019/195039 | 10/2019 |

OTHER PUBLICATIONS

Office Action for Japanese Patent Application No. 2022529027, mailed Jun. 30, 2023, 5 pages.
Office Action for Japanese Patent Application No. 2022-551360, mailed Nov. 2, 2023, 4 pages.
Office Action for Japanese Patent Application No. 2022-553668, mailed Sep. 1, 2023, 9 Pages.
Office Action from Taiwan Patent Application No. 108137373, dated Oct. 6, 2023, 4 pages.
Papanastasiou S., et al., "Bridging the Gap between Physical Layer Emulation and Network Simulation," IEEE Wireless Communication and Networking Conference, Date of Conference: Apr. 18-21, 2010, 06 pages.
Purdue University: "Intrusion Alert: System Uses Machine Learning, Curiosity-Driven 'Honeypots' To Stop Cyber Attackers," Research Foundation News, Feb. 6, 2020, 06 Pages, Retrieved From URL: https://engineering.purdue.edu/ECE/News/2020/intrusion-alert-system-uses-machine-learning-curiosity-driven-honeypots-to-stop-cyber-attackers.
Real R., et al., "The Probabilistic Basis Of Jaccard's Index Of Similarity," Systematic Biology, 1996, vol. 45, No. 3, pp. 380-385.

(56) References Cited

OTHER PUBLICATIONS

Sakurada M., et al., "Anomaly Detection Using Autoencoders With Nonlinear Dimensionality Reduction," Proceedings of the Machine Learning for Sensory Data Analysis (MLSDA) 2nd Workshop on Machine Learning for Sensory Data Analysis, 2014, 8 Pages.
Saunders J.A., et al., "Visual Feedback Control Of Hand Movements," The Journal of Neuroscience, Mar. 31, 2004, vol. 24, No. 13, pp. 3223-3234.
Simon T., etal, "Hand Keypoint Detection in Single Images Using Multiview Bootstrapping," Proceedings of the IEEE conference on Computer Vision and Pattern Recognition, 2017, pp. 1145-1153.
SPC for Excel: "Control Chart Rules and Interpretation," BPI Consulting, LLC, Mar. 2016, 20 Pages, [Retrieved on Jul. 23, 2019], Retrieved From URL: https://www.spcforexcel.com/knowledge/control-chart-basics/control-chart-rules-interpretation.
SPC for Excel: "Interpreting Control Charts," BPI Consulting, LLC, Apr. 2004, 9 Pages, [Retrieved on Jul. 23, 2019], Retrieved From URL: https://www.spcforexcel.com/knowledge/control-charts-basics/interpreting-control-charts.
Supplementary European Search Report for European Patent Application No. 21760563.3, mailed Jul. 18, 2023, 12 Pages.
Szkilnyk G., "Vision Based Fault Detection In Assembly Automation," Queen's University, Jun. 2012, 219 Pages.
Thrun, "Probabilistic robotics," Communications of the ACM 45.3, 2002, pp. 52-57.
Thrun S., et al., "Probabilistic Robotics," pp. 1999-2000.
Vecerik M., et al., "Leveraging Demonstrations For Deep Reinforcement Learning on Robotics Problems with Sparse Rewards," arXiv preprint, arXiv: 1707.08817, Submitted on Jul. 27, 2017, 10 Pages, Last revised on Oct. 8, 2018.
Vollmer T., et al., "Cyber-Physical System Security With Deceptive Virtual Hosts for Industrial Control Networks," IEEE Transactions On Industrial Informatics, IEEE Service Center, vol. 10, No. 2, May 2014, pp. 1337-1347.
Zhong R.Y., et al., "Intelligent Manufacturing In The Context Of Industry 4.0: A Review," Engineering, Mar. 31, 2017, vol. 3, No. 5, pp. 616-630.
Zhou C., et al., "Anomaly Detection with Robust Deep Autoencoders," Proceedings of the 23rd Acm Sigkdd International Conference on Knowledge Discovery and Data Mining, Aug. 13-17, 2017, pp. 665-674.
Office Action for Japanese Patent Application No. 2022-207136, mailed Nov. 24, 2023, 6 pages.
Office Action for TW Patent Application No. 11221179860, mailed Nov. 27, 2023, 10 pages.
American Society for Quality: "What is Statistical Process Control?," 2021, 07 Pages, [Retrieved on Jul. 23, 2019], Retrieved from URL: https://asq.org/quality-resources/statistical-process-control.
An J., etal, "Variational Autoencoder Based Anomaly Detection Using Reconstruction Probability," Special Lecture on IE 2.1,Dec. 27, 2015, pp. 1-18.
Bose A., et al., "Behavioral Detection of Malware on Mobile Handsets," MobiSys, Proceedings of the 6th International Conference on Mobile Systems, Applications, and Services, Jun. 17-20, 2008, pp. 225-238.
Evangelidis G.D., etal, "Parametric Image Alignment Using Enhanced Correlation Coefficient Maximization," IEEE Transactions on Pattern Analysis and Machine Intelligence, Oct. 2008, vol. 30, No. 10, pp. 1-8.
Extended European Search Report for European Application No. 19916905.3, mailed Sep. 9, 2022, 10 Pages.
Extended European Search Report for European Application No. 20156940.7, mailed Aug. 10, 2020, 12 Pages.
Extended European Search Report for European Application No. 20763956.8, mailed Sep. 9, 2022, 11 Pages.
Extended European Search Report for European Application No. 20832713.0, mailed Jan. 3, 2023, 10 Pages.
Fujimoto S., et al., "Addressing Function Approximation Error In Actor-critic Methods," Proceedings of the 35th International Conference on Machine Learning Research, Oct. 22, 2018, 15 Pages.

Goodfellow I.J., et al., "Generative Adversarial Nets," Proceedings of Advances in Neural Information Processing Systems, 2014, 9 Pages.
International Preliminary Report on Patentability for International Application No. PCT/US2019/053746, mailed Sep. 10, 2021, 6 Pages.
International Preliminary Report on Patentability for International Application No. PCT/US2020/029022, mailed Sep. 10, 2021, 6 Pages.
International Preliminary Report on Patentability for International Application No. PCT/US2020/039064, mailed Jan. 6, 2022, 7 Pages.
International Preliminary Report on Patentability for International Application No. PCT/US2020/052254, mailed Apr. 21, 2022, 7 Pages.
International Preliminary Report on Patentability for International Application No. PCT/US2020/059339, mailed May 19, 2022, 13 Pages.
International Preliminary Report on Patentability for International Application No. PCT/US2020/061434, mailed Jun. 2, 2022, 09 Pages.
International Preliminary Report on Patentability for International Application No. PCT/US2021/019857, mailed Sep. 9, 2022, 14 Pages.
International Preliminary Report on Patentability for International Application No. PCT/US2021/021440, mailed Sep. 22, 2022, 09 Pages.
International Search Report and Written Opinion for International Application No. PCT/US2019/053746, mailed Nov. 5, 2019, 7 Pages.
International Search Report and Written Opinion for International Application No. PCT/US2020/029022, mailed Jul. 9, 2020, 08 Pages.
International Search Report and Written Opinion for International Application No. PCT/US2020/039064, mailed Jul. 30, 2020, 8 Pages.
International Search Report and Written Opinion for International Application No. PCT/US2020/059339, mailed Feb. 5, 2021, 14 Pages.
International Search Report and Written Opinion for International Application No. PCT/US2020/061434, mailed Feb. 22, 2021, 10 Pages.
International Search Report and Written Opinion for International Application No. PCT/US2021/019857, mailed May 7, 2021, 15 Pages.
International Search Report and Written Opinion for International Application No. PCT/US2021/021440, mailed May 20, 2021, 10 Pages.
International Search Report and Written Opinion for International Application No. PCT/US2021/038085, mailed Sep. 29, 2021, 14 Pages.
Karnouskos S., "Stuxnet Worm Impact On Industrial Cyber-Physical System Security," IECON, 37th Annual Conference of the IEEE Industrial Electronics Society, IEEE, 2011,5 Pages.
Kingma D.P., et al., "Adam: A Method for Stochastic Optimization," International Conference on Learning Representations 2015, arXiv preprint arXiv: 1412.6980v9[cs.LG] Jan. 30, 2017, 15 Pages.
Lardinois F., "Nvidia's Researchers Teach A Robot To Perform Simple Tasks By Observing A Human," 6 Pages,[Retrieved on Nov. 3, 2019], Retrieved from URL: https://techcrunch.com/2018/05/20/nvidias-researchers-teach-a-robot-to-learn-simple-tasks-by-observing-a-human/?utm_source=tcfbpageutm_medium=feedutm_campaign=Feed%3A+Techcrunch+%28TechCrunch%29sr_share=facebook.
Lillicrap T.P., et al., Continuous Control With Deep Reinforcement Learning, Published as a Conference Paper at ICLR 2016, arXiv: 1509.02971v6 [cs.LG], Last Revised on Jul. 5, 2019, 14 Pages.
Liu H., et al., "Intelligent Tuning Method Of Pid Parameters Based On Iterative Learning Control For Atomic Force Microscopy," Science Direct Micron, 2018, vol. 104, pp. 26-36.
Malhotra P., et al., "LSTM-Based Encoder-Decoder for Multi-Sensor Anomaly Detection," arXiv preprint arXiv: 1607.00148, Last Revised on Jul. 11, 2016, 5 pages.

(56) References Cited

OTHER PUBLICATIONS

Mnih V., etal, "Playing Atari With Deep Reinforcement Learning," arXiv preprint arXiv: 1312.5602v1, Dec. 19, 2013, 9 pages.
Mueller F., et al., "Real-time Hand Tracking under Occlusion from an Egocentric RGB-D Sensor," Max-Planck-Institute for Informatics, Germany, Universidad Rey Juan Carlos, Spain, Oct. 5, 2017, 16 Pages.
NG A., "Sparse Autoencoder," CS294A Lecture Notes 72.2011,2011, pp. 1-19.
Notice of Allowance for Taiwanese Patent Application No. 108137373, mailed Oct. 12, 2023, 4 pages.
Office Action and Search Report from Taiwan Patent Application No. 108137373, dated Mar. 31, 2023, 24 pages.
Office Action and Search Report from Taiwan Patent Application No. 111130991, dated May 17, 2023,19 pages.
Office Action and Search Report from Taiwan Patent Application No. 112103333, dated Aug. 21,2023, 8 Pages.
Office Action for Chinese Patent Application No. 202080073852.7, mailed Nov. 1, 2023, 10 Pages.
Office Action for Chinese Patent Application No. 2020800738527, mailed Apr. 25, 2023, 37 Pages.
Office Action for European Patent Application No. 20156940.7, mailed Feb. 10, 2023, 6 Pages.
Office Action for European Patent Application No. 21760563.3, mailed Jul. 18, 2023, 1 Page.
Office Action for Japanese Patent Application No. 2021549835, mailed Sep. 22, 2023, 7 pages.
Office Action for Japanese Patent Application No. 2021-549835, mailed Mar. 3, 2023, 7 Pages.
Office Action for Japanese Patent Application No. 2021575060, mailed Jun. 2, 2023, 7 pages.
Office Action for Japanese Patent Application No. 2021575060, mailed Oct. 13, 2023, 3 pages.
Office Action for Japanese Patent Application No. 2022-520885, mailed Nov. 2, 2023, 5 pages.
Office Action for Japanese Patent Application No. 2022520885, mailed Jun. 30, 2023, 10 Pages.
Office Action for Japanese Patent Application No. 2022529027, mailed Oct. 13, 2023, 3 pages.
Office Action from Taiwan Patent Application No. 11221224400, dated Dec. 6, 2023, 18 pages.
Office Action from Indian Patent Application No. 202217044168, dated Nov. 30, 2023, 10 pages.
Extended Search Report from European Patent Application No. 20874557.0, dated Oct. 19, 2023, 12 Pages.
Potluri, et al., "Deep learning based efficient anomaly detection for securing process control systems against injection attacks," 2019 IEEE 15th International Conference on Automation Science and Engineering (CASE), 2019, pp. 854-860.
Erba, et al., "Real-time evasion attacks with physical constraints on deep learning-based anomaly detectors in industrial control systems," arXiv preprint arXiv:1907.07487, 2019, 15 pages.
Notification of Reason for Refusal from Korean Patent Application No. 10-2021-7030695, dated Dec. 18, 2023, 13 Pages.
Notice of Allowance for Japanese Patent Application No. 2021-549835, mailed Jan. 5, 2024, 3 Page.
Office Action for Japanese Patent Application No. 2022577143, mailed Jan. 12, 2024, 7 pages.
Office Action for Chinese Patent Application No. 202080044987.0, mailed Jan. 29, 2024, 7 pages.
Office Action for Chinese Patent Application No. 202080016336.0, mailed Feb. 1, 2024, 8 pages.
Office Action for Japanese Patent Application No. 2022-553668, mailed Feb. 9, 2024, 9 pages.
Extended European Search Report for European Application No. 20885424.0 dated Jan. 5, 2024, 12 pages.
Extended European Search Report for European Application No. 20889594.6 dated Nov. 27, 2023, 87 pages.
Notice of Allowance from Japanese Patent Application No. 2022-551360, dated Feb. 16, 2024, 3 pages.
Notice of Allowance for Korean Patent Application No. 10-2021-7039615, mailed Feb. 27, 2024, 8 pages.
Office Action from Chinese Patent Application No. 201980092196.2, dated Feb. 29, 2024, 12 pages.
Office Action from KR Patent Application No. 10-2022-7014934, dated Mar. 21, 2024, 15 pages.
Office Action for Chinese Patent Application No. 202080073852.7, dated Apr. 19, 2024, 15 pages.
Office Action for Chinese Patent Application No. 202180014828.0, dated Apr. 28, 2024, 8 pages.
Office Action for TW Patent Application No. 112103333, dated May 2, 2024, 3 pages.
Notice of Allowance for Taiwan Patent Application No. 112113077, dated May 14, 2024, 6 pages.
Office Action for European Application No. 21767468.8 mailed Mar. 22, 2024, 12 Pages.
Notice of Allowance from Taiwan Patent Application No. 111108232, dated May 30, 2024, 8 pages.
Notice of Allowance from Japan Patent Application No. 2022-577143, dated May 31, 2024, 2 pages.
Office Action from Chinese Patent Application No. 202080079163.7, dated Jun. 4, 2024, 10 pages.
Office Action from India Patent Application No. 202318013498, dated May 31, 2024, 7 pages.
Office Action for Japanese Patent Application No. 2023-116653, mailed Jul. 12, 2024, 6 pages.
Notice of Allowance for TW Patent Application No. 109121636, mailed Jul. 9, 2024, 4 pages.
Office Action for Japanese Patent Application No. 2022-207136, mailed Jul. 26, 2024, 6 pages.
Office Action for Korean Patent Application No. 10-2022-7032975, mailed Jul. 20, 2024, 16 pages.
Office Action for Korean Patent Application No. 10-2021-7030695, mailed Jul. 12, 2024, 6 pages.
Office Action for Japanese Patent Application No. 2023-192266, mailed Aug. 9, 2024, 9 pages.
Notice of Allowance for Chinese Patent Application No. 202080044987.0, mailed Aug. 20, 2024, 4 pages.
Office Action for EP Patent Application No. 19916905.3, mailed May 28, 2024, 7 pages.
Office Action for EP Patent Application No. 20763956.8, mailed May 28, 2024, 7 pages.

\* cited by examiner

DYNAMIC MONITORING AND SECURING OF FACTORY PROCESSES, EQUIPMENT AND AUTOMATED SYSTEMS

CROSS-REFERENCE TO RELATED APPLICATIONS

This application is a continuation of U.S. patent application Ser. No. 16/781,193, filed Feb. 4, 2020, which claims the priority to U.S. Provisional Application No. 62/950,588, filed Dec. 19, 2019, which are incorporated by reference in their entireties. This application is further related to U.S. Provisional Patent Application No. 62/912,291, filed Oct. 8, 2019 and U.S. Provisional Patent Application No. 62/938,158, filed Nov. 20, 2019, which are incorporated by reference in their entireties.

BACKGROUND

1. Technical Field

The present disclosure generally relates to systems, apparatuses and methods for dynamically monitoring and securing factory processes, equipment and automated systems against attacks that can interfere with a factory's operation and control.

2. Introduction

Malware attacks against factories are proliferating and becoming very sophisticated. Further, these malware attacks are often capable of penetrating isolated and closed computer networks, as well as machines connected to external networks (e.g., 4G and 5G networks). Many of these attacks often target the operation and control of factory processes, equipment and automated systems (collectively referred to herein as, the "operation and control of factories"). Malware, as used herein, refers to any hardware or software that causes damage, disruption, or unauthorized manipulation, for example, to a computer, server, controller, computer network, computer-controlled equipment, data, or the quality or yield of a final output. Malware can include computer viruses, worms, Trojan horses, spyware, backdoors, or generally any program or file that can be harmful to a computer system. Although in most cases malware is deliberately designed to inflict damage, disruption or provide unauthorized access or manipulation (collectively, "interference"), interference can also occur from nonintentional introductions of software and/or hardware.

Malware can take many forms including, but not limited to, computer viruses, worms, Trojan horses, spyware, backdoors, faulty components. Malware can be designed to cause subtle changes to the operation and control of factories and are often able to evade conventional information technology (IT) security solutions or conventional process control systems. While the changes to the operation and control of factories may be subtle, the impact of the malware attacks on the factories' output and equipment can be severe and catastrophic. For instance, malware attacks can be directed at programmable logic controllers or other controllers, which control a factory's processes and equipment, to alter the controllers' programming in a damaging way (e.g., by instructing equipment to operate faster or slower than prescribed, by introducing rapid or frequent changes to control parameters, by increasing or decreasing the control parameters at greater increments than prescribed). Additionally, these attacks can provide false feedback to the controllers that the equipment is operating at normal levels. As a result, the controllers can receive feedback that everything is operating normally, which can cause IT security solutions or conventional process control systems to not be activated. Thus, the equipment can continue to operate at abnormal levels until the equipment or the output becomes irreversibly damaged and the yield noticeably diminished.

Accordingly, it is desirable to provide a new mechanism for dynamically securing factory processes, equipment and automated systems by dynamically detecting anomalous activity, however subtle, before serious damage to factory processes, equipment and final output occurs.

SUMMARY

In one example, a computer-implemented method includes obtaining response data of at least two data types corresponding to operations and control of a manufacturing process, generating, by a processor of a manufacturing process control system, expected behavioral pattern data corresponding to expected operations and control of the manufacturing process, processing the response data to obtain actual behavioral pattern data corresponding to the operations and the control of the manufacturing process, detecting, based on an evaluation of the expected behavioral pattern data and the actual behavioral pattern data, anomalous activity in the manufacturing process, and providing an indication of the anomalous activity as a result of detection of the anomalous activity in the manufacturing process.

In some examples, the response data is generated via one or more iterations through a set of process stations used in the manufacturing process.

In some examples, the anomalous activity is detected as a result of an identification of unusual frequency patterns in the actual behavioral pattern data in relation to the expected behavioral pattern data.

In some examples, the expected behavioral pattern data is generated using a set of universal inputs, functional priors, and experiential priors of the manufacturing process as input to one or more machine learning algorithms trained to generate the expected behavioral pattern data.

In some examples, the method further includes, as a result of detecting the anomalous activity, evaluating a difference between the actual behavioral pattern data and the expected behavioral pattern data to determine whether the anomalous activity corresponds to a malware attack.

In some examples, the method further includes identifying, in response to detecting the anomalous activity, a component that is a source of the anomalous activity, and instructing the component to generate an alert that identifies the anomalous activity, a source of the anomalous activity, and a type of the anomalous activity.

In some examples, the method further includes assigning a threshold to a confidence level associated with the detection of the anomalous activity, and performing a predefined action when the threshold is reached.

In one example, a system includes one or more processors, and memory storing thereon instructions that, as a result of being executed by the one or more processors, cause the system to obtain response data of at least two data types generated as a result of a manufacturing process iterating through a set of process stations, analyze, using one or more machine learning algorithms, factory operation and control data to generate expected behavioral pattern data, evaluate, using the one or more machine learning algorithms, the response data to generate actual behavioral pattern data corresponding to the manufacturing process, determine, based on an analysis of the expected behavioral pattern data and the actual behavior pattern data, whether anomalous activity occurred as a result of the manufacturing process, and provide an indication of the anomalous activity if determined that the anomalous activity occurred.

In some examples, the analysis includes a comparison of actual behavioral pattern data to the expected behavioral pattern data with respect at least one nominal setpoint value and the expected behavioral pattern data in a frequency domain.

In some examples, the one or more processors include at least a deep learning processor is configured to implement the one or more machine learning algorithms.

In some examples, the instructions that cause the system to determine whether the anomalous activity occurred as the result of the manufacturing process further cause the system to determine, based on changes in the response data, whether the anomalous activity is a malware attack.

In some examples, the instructions that cause the system to provide the indication of the anomalous activity further cause the system to communicate with a supply chain management system to alert the supply chain management system of a source of the anomalous activity.

In some examples, the instructions that cause the system to provide the indication of the anomalous activity further cause the system to identify, based on the analysis, a component of the manufacturing process that is a source of the anomalous activity, and instruct the component of the manufacturing process to generate an alert that identifies the anomalous activity, the source of the anomalous activity, and a type of the anomalous activity.

In one example, a non-transitory computer-readable storage medium stores thereon executable instructions that, as a result of being executed by one or more processors of a computer system, cause the computer system to obtain, from one or more process stations executing a manufacturing process, response data of at least two data types generated by the one or more process stations, generate, using factory operation and control data and using one or more machine learning algorithms, expected behavioral pattern data, generate, using the response data and using the one or more machine learning algorithms, actual behavioral pattern data corresponding to the response data, analyze the expected behavioral pattern data and the actual behavioral pattern data to determine whether anomalous activity occurred as a result of the manufacturing process, and provide an indication of the anomalous activity if determined that the anomalous activity occurred.

In some examples, the executable instructions that cause the computer system to analyze the expected behavioral pattern data and the actual behavioral pattern data to determine whether the anomalous activity occurred further cause the computer system to compare the actual behavioral pattern data to the expected behavioral pattern data with respect to nominal setpoint values and the expected behavioral pattern data in a frequency domain, and determine, based on the nominal setpoint values and the expected behavioral pattern data in the frequency domain, whether the anomalous activity occurred.

In some examples, the executable instructions further cause the computer system to determine, based on a comparison of changes in the actual behavioral pattern data to changes in the expected behavioral pattern data, whether the anomalous activity corresponds to a malware attack.

In some examples, the executable instructions that cause the computer system to provide the indication of the anomalous activity further cause the computer system to communicate with a supply chain management system to alert a source of an infected process component.

In some examples, the anomalous activity is detected as a result of an identification of unusual amplitude patterns in the actual behavioral pattern data in relation to the expected behavioral pattern data.

In some examples, the expected behavioral pattern data is generated using a set of universal inputs, functional priors, and experiential priors of the manufacturing process as input to one or more machine learning algorithms trained to generate the expected behavioral pattern data.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting in their scope, the principles herein are described and explained with additional specificity and detail through the use of the accompanying drawings in which.

DETAILED DESCRIPTION

Figure 1:
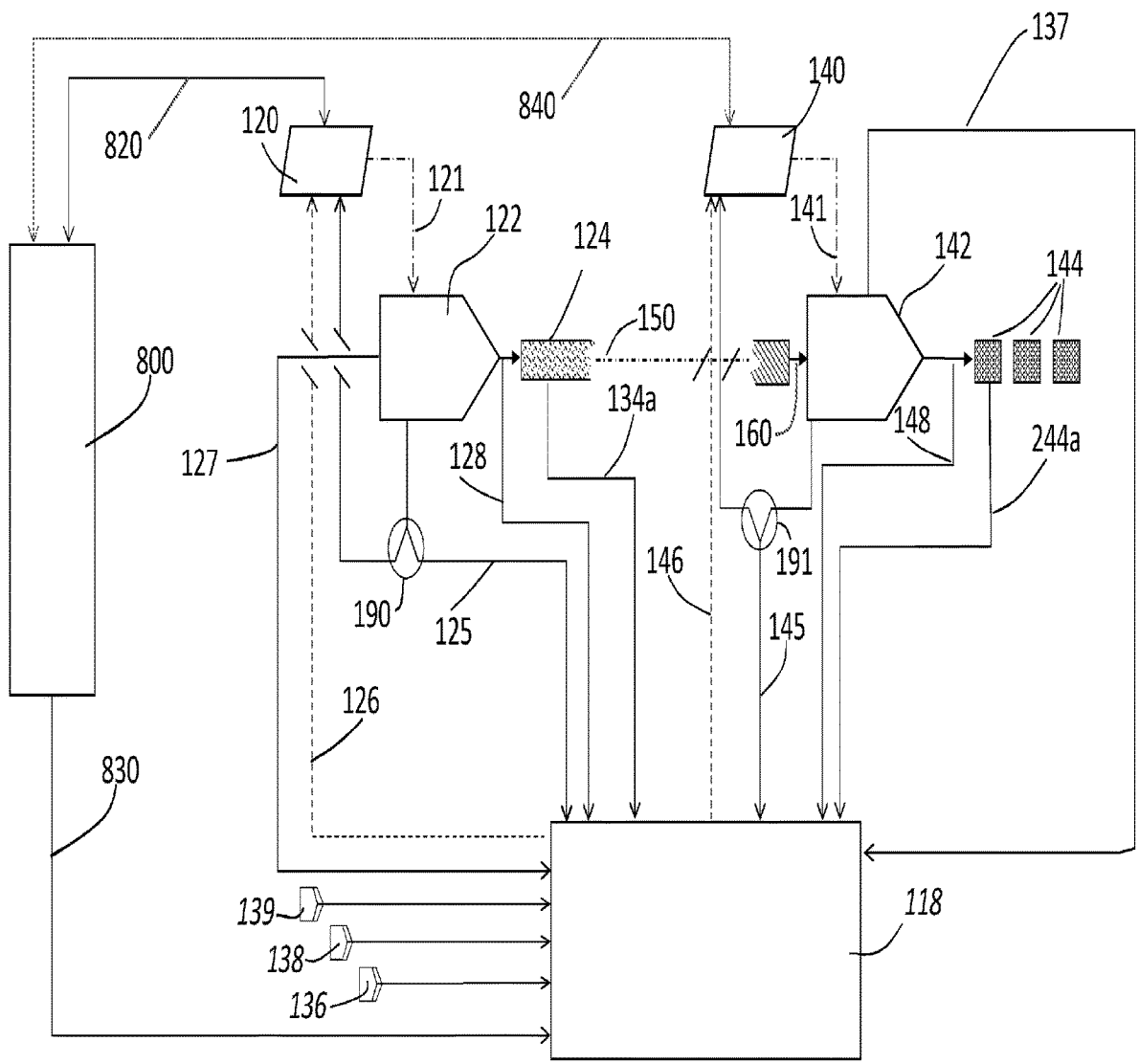
FIG. 1 illustrates an example method of providing inputs to a deep learning processor during operation and control of a factory process.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Manufacturing at a factory relies on many process stations that are automatically controlled. These automatically controlled process stations are vulnerable to attacks from malware, which if not detected early can cause interference or non-repairable damage to equipment and product yield. In order to understand a factory's exposure to malware, some background on the manufacturing process will be provided. Note, "manufacturing process" and "factory process" are used interchangeably herein. While the dynamic monitoring and securing mechanisms disclosed herein refer to a manufacturing or factory process, the dynamic monitoring and securing mechanisms can also be applied to any industrial environment or network infrastructure.

In particular, manufacturing is complex and comprises different process stations (or "stations") that process raw materials until a final product (referred to herein as "final output") is produced. With the exception of the final process station, each process station receives an input for processing and outputs an intermediate output that is passed along to one or more subsequent (downstream) processing station for additional processing. The final process station receives an input for processing and outputs the final output.

Each process station can include one or more tools/equipment that performs a set of process steps on: received raw materials (this can apply to a first station or any of the subsequent stations in the manufacturing process) and/or the received output from a prior station (this applies to any of the subsequent stations in the manufacturing process). Examples of process stations can include, but are not limited to conveyor belts, injection molding presses, cutting machines, die stamping machines, extruders, CNC mills, grinders, assembly stations, 3D printers, robotic devices, quality control and validation stations. Example process steps can include: transporting outputs from one location to another (as performed by a conveyor belt); feeding material into an extruder, melting the material and injecting the material through a mold cavity where it cools and hardens to the configuration of the cavity (as performed by an injection molding presses); cutting material into a specific shape or length (as performed by a cutting machine); pressing material into a particular shape (as performed by a die stamping machine).

In manufacturing processes, process stations can run in parallel or in series. When operating in parallel, a single process station can send its intermediate output to more than 1 stations (e.g., 1 to N stations), and a single process station can receive and combine intermediate outputs from more than one to N stations. Moreover, a single process station can perform the same process step or different process steps, either sequentially or non-sequentially, on the received raw material or intermediate output during a single iteration of a manufacturing process.

Operation of each process station can be governed by one or more process controllers. In some implementation, each process station has one or more process controllers (referred to herein as "a station controller") that are programmed to control the operation of the process station (the programming algorithms referred to herein as "control algorithms"). However, in some aspects, a single process controller may be configured to control the operations of two or more process stations. One example of a factory controller is a Programmable Logic Controller (PLC). A PLC can be programmed to operate manufacturing processes and systems. The PLC or other controller can receive information from connected sensors or input devices, process the data and generate outputs (e.g., control signals to control an associated process station) based on pre-programmed parameters and instructions.

An operator or control algorithms can provide the station controller with station controller setpoints (or "setpoints" or "controller setpoints" or CSPs) that represent a desired single value or range of values for each control value. The values that can be measured during the operation of a station's equipment or processes can either be classified as control values or station values. A value that is controlled by a station controller will be classified herein as control values, the other measured values will be classified herein as station values. Examples of control and/or station values include, but are not limited to: speed, temperature, pressure, vacuum, rotation, current, voltage, power, viscosity, materials/resources used at the station, throughput rate, outage time, noxious fumes, the type of steps and order of the steps performed at the station. Although, the examples are the same, whether a measured value is classified as a control value or a station value, will depend on the particular station and whether the measured value is controlled by a station controller or is simply a byproduct of the operation of the station. During the manufacturing process, control values are provided to a station controller, while station values are not.

The control algorithms can also include instructions for monitoring control values, comparing control values to corresponding setpoints and determining what actions to take when the control value is not equal to (or not within a defined range of) a corresponding station controller setpoint. For example, if the measured present value of the temperature for the station is below the setpoint, then a signal may be sent by the station controller to increase the temperature of the heat source for the station until the present value temperature for the station equals the setpoint. Conventional process controllers used in the manufacturing process to control a station are limited, because they follow static algorithms (e.g., on/off control, PI control, PID control, Lead/Lag control) for prescribing what actions to take when a control value deviates from a setpoint.

One or more sensors can be included within or coupled to each process station. These can be physical or virtual sensors that exist in a manufacturing process unrelated to the operation of deep learning processor 118, as well as any new sensors that can be added to perform any additional measurements required by deep learning processor 118. Sensors can be used to measure values generated by a manufacturing process such as: station values, control values, intermediate and final output values. Example sensors can include, but are not limited to: rotary encoders for detecting position and speed; sensors for detecting proximity, pressure, temperature, level, flow, current and voltage; limit switches for detecting states such as presence or end-of-travel limits. Sensor, as used herein, includes both a sensing device and signal conditioning. For example, the sensing device reacts to the station or control values and the signal conditioner translates that reaction to a signal that can be used and interpreted by deep learning processor or the station controller. Example of sensors that react to temperature are RTDs, thermocouples and platinum resistance probes. Strain gauge sensors react to pressure, vacuum, weight, change in distance among others. Proximity sensors react to objects when they are within a certain distance of each other or a specified tart. With all of these examples, the reaction must be converted to a signal that can be used by a station controller or deep learning processor. In many cases the signal conditioning function of the sensors produce a digital signal that is interpreted by the station controller. The signal conditioner can also produce an analog signal or TTL signal among others. Virtual sensors also known as soft sensors, smart sensors or estimators include system models that can receive and process data from physical sensors.

A process value, as used herein refers to a station value or control value that is aggregated or averaged across an entire series of stations (or a subset of the stations) that are part of the manufacturing process. Process values can include, for example, total throughput time, total resources used, average temperature, average speed.

In addition to station and process values, various characteristics of a process station's product output (i.e., intermediate output or final output) can be measured, for example: temperature, weight, product dimensions, mechanical, chemical, optical and/or electrical properties, number of design defects, the presence or absence of a defect type. The various characteristics that can be measured, will be referred to generally as "intermediate output value" or "final output value." The intermediate/final output value can reflect a single measured characteristic of an intermediate/final output or an overall score based on a specified set of characteristics associated with the intermediate/final output that are measured and weighted according to a predefined formula.

Mechanical properties can include hardness, compression, tack, density and weight. Optical properties can include absorption, reflection, transmission, and refraction. Electrical properties can include electrical resistivity and conductivity. Chemical properties can include enthalpy of formation, toxicity, chemical stability in a given environment, flammability (the ability to burn), preferred oxidation states, pH (acidity/alkalinity), chemical composition, boiling point, vapor point). The disclosed mechanical, optical, chemical and electrical properties are just examples and are not intended to be limiting.

Malware can be designed to disrupt the proper functioning of the operation and control of a factory in a number of ways. For instance, malware executing on a computing device may cause a station controller to send control signals to its associated process station(s) to operate at levels that will be harmful to the equipment itself or its output. Additionally, this malware may cause fluctuating control values at a harmful rate or at harmful increments. Further, computing devices executing malware or other malicious applications may provide false feedback to the station controller, so that the controller is not aware of harmful conditions at an associated process station and, thus, may not make needed adjustments. Malware can also be designed to target one or more sensors to manipulate or corrupt the measured values generated by a manufacturing process. Malware can also be designed to intercept or monitor data generated throughout the manufacturing process or data communicated among components involved in the manufacturing process such as station processors, controllers, data processing servers, sensors.

While a range of IT solutions such as antivirus software, firewalls and other strategies exist to protect against the introduction of malware, malware has become more sophisticated at evading such solutions. The disclosed technology focuses on dynamically monitoring measured values and outputs from the operation and control of the factory processes, equipment and automated systems, and identifying disruptions, or any unexpected changes, whether due to the presence of malware or other harmful or unexpected system changes. Although some conventional methods exist (e.g., Statistical Process Control (SPC)) that provide alerts when the operation and control of factories exceed certain limits, they do not provide alerts when the operation and control of factories are in control and are limited in their ability to analyze trends across many stations or the impact of several stations together.

Accordingly, it is desirable to provide a new mechanism for securing factory processes, equipment and automated systems by dynamically detecting anomalous activity, however subtle, before damage to the manufacturing process occurs. It is also desirable to provide a mechanism that monitors the inputs to and outputs of each station (and their associated controllers) individually, and together with the inputs to and outputs of other stations (and their associated controllers) in the manufacturing process, to dynamically identify anomalous activity. In some instances, anomalous activity can be caused by the introduction of malware, but it is understood that anomalous activity can refer more generally to other causes, beyond malware, that interfere with the control and operation of factories.

A deep learning processor based on machine-learning (ML) or artificial intelligence (AI) models may be used to evaluate control values, station values, process values, data output, and/or intermediate and final output values (collectively, "response data") along with associated station controller setpoints, functional priors, experiential priors, and/or universal inputs to identify any variation from typical factory control and operation. As understood by those of skill in the art, machine learning based techniques can vary depending on the desired implementation, without departing from the disclosed technology. For example, machine learning techniques can utilize one or more of the following, alone or in combination: hidden Markov models; recurrent neural networks; convolutional neural networks (CNNs); deep-learning; Bayesian symbolic methods; reinforcement learning, general adversarial networks (GANs); support vector machines; image registration methods; long-term, short term memory (LSTM); and the like.

Machine learning models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. The machine learning models can be based on supervised and/or unsupervised methods.

Machine learning models, as discussed herein, can also be used to determine the process stations, control, station, or process values and intermediate output values that are most influential on the final output value ("key influencers"), and to optimize detecting malware attacks by targeting the key influencers.

FIG. 1 illustrates an example deep learning processor 118 that can be configured to dynamically monitor for anomalous activity of any number of (referred to herein by "N") processing stations in a manufacturing process. In FIG. 1, the N processing stations of a manufacturing process are represented by process stations 122 and 142. The process stations can operate serially or in parallel.

Setpoints, algorithms, initial input and operating instructions, system and process updates and other control inputs to station controllers 120 and 140 (steps 820 and 840 respectively), can be provided by a local or central data processing server 800. In some embodiments, steps 820 and 840 can be performed manually by an operator. Data processing server 800, in some embodiments, can also receive data output generated by station controllers 120 and 140, as well as data generated by sensors coupled to or within process stations 122 or 142, or from independent sensors 127 and 137. Data output, includes, but is not limited to: (i) data generated during the manufacturing process (e.g., data logs coupled to physical sensors, process station components, or station controller components); (ii) data received by or transmitted from each process station or station controller and (iii) data communications and data generation patterns of individual or any number of process stations or station controllers (e.g., high data volumes, low data volumes, erratic data volumes, unusual data communication or data generation based on time of day, origin or destination of the data). In further embodiments, data processing server 800 can receive all response data, as defined in connection with FIGS. 2 and 4.

The data output can be provided to deep learning processor 118 (step 830). In some embodiments, data processing server 800 can also receive data from related manufacturing processes occurring in remote geographic locations and provide such data to deep learning controller 118. Not all data inputs to data processing server 800 are shown in FIG. 1.

Universal inputs 136, experiential priors 139, functional priors 138, and values from each of the N stations (e.g., 122 and 142) can be provided to deep learning processor 118. In other embodiments, any number of additional deep learning processors can be used and configured to dynamically monitor for anomalous activity of N processing stations in a manufacturing process.

Functional priors, as used herein, refers to information relating to the functionality and known limitations of each process station, individually and collectively, in a manufacturing process. The specifications for the equipment used at the process station are all considered functional priors. Example functional priors can include, but are not limited to: a screw driven extruder that has a minimum and maximum speed that the screw can rotate; a temperature control system that has a maximum and minimum temperature achievable based on its heating and cooling capabilities; a pressure vessel that has a maximum pressure that it will contain before it explodes; a combustible liquid that has a maximum temperature that can be reached before combustion. Functional priors can also include an order in which the individual stations that are part of a manufacturing process perform their functions.

Experiential priors, as used herein, refers to information gained by prior experience with, for example performing the same or similar manufacturing process; operating the same or similar stations; producing the same or similar intermediate/final outputs; root cause analysis for defects or failures in final outputs for the manufacturing process and solutions. In some embodiments, experiential priors can include acceptable final output values or unacceptable final output values. Acceptable final output values refer to an upper limit, lower limit or range of final output values where the final output is considered "in specification." In other words, acceptable final output values describe the parameters for final output values that meet design specification, i.e., that are in-specification. Conversely, unacceptable final output values refer to upper/lower limits or range of final output values where the final output is "not in specification" (i.e., describe the parameters for final output values that do not meet design specifications). For example, based on prior experience it might be known that an O-ring used to seal pipes, will only seal if it has certain compression characteristics. This information can be used to establish acceptable/unacceptable compression values for an O-ring final output. In other words, all O-ring final outputs that have acceptable compression values are able to perform their sealing functionality, while all O-ring final outputs that have unacceptable compression values cannot perform their sealing functionality. Acceptable intermediate output values, which can be defined per station, refer to upper/lower limits or a range of intermediate output values that define the parameters for an intermediate output that can ultimately result in a final output that is in specification, without requiring corrective action by other stations. Unacceptable intermediate output values, which can also be defined by station, refer to upper/lower limits or range of intermediate output values that define the parameters for an intermediate output that will ultimately result in a final output that is not in specification, unless corrective action is taken at another station. Similarly, acceptable/unacceptable parameters can be defined for other variables relating to the manufacturing process:

| | |
|---|---|
| Acceptable control, station or setpoint values | Upper or lower limits or range of values, defined per station for each type of control or station value and setpoint, that define the parameters for, or are an indication of, satisfactory station performance. Satisfactory performance refers to (1) the performance of the station itself (e.g., throughput rate is not too slow, there is no outage, noxious fumes or other harmful condition, resources are being used efficiently); and/or (2) control, station or setpoint values that cause an in specification final output to be achievable, without requiring corrective action by other stations. |
| Unacceptable control, station or setpoint values | Upper or lower limits or range of values, defined per station for each type of control, station or setpoint value, that define the parameters for, or are an indication of, unsatisfactory station performance. Unsatisfactory performance refers to (1) the performance of the station itself (e.g., throughput rate is too slow, an outage, noxious fumes or other harmful station condition, resources are not being used efficiently); and/or (2) control, station or setpoint values that cause an in specification final output to be unachievable, unless corrective action by other stations is taken. |

| | |
|---|---|
| Acceptable process performance | Upper or lower limits or range of values for each type of process value, that define the parameters for, or are an indication of, satisfactory performance of the manufacturing process. Satisfactory performance refers to (1) the functioning of the process itself (e.g., throughput rate is not too slow, there is no outage, noxious fumes or other harmful condition, resources are being used efficiently); and/or (2) process values that cause an in specification final output to be achievable. |
| Unacceptable process performance | Upper or lower limits or range of values, defined for each type of process value, that define the parameters for, or are an indication of, unsatisfactory process performance. Unsatisfactory performance refers to (1) the process performance itself (e.g., throughput rate is too slow, there is an outage, noxious fumes or other harmful condition, resources are not being used efficiently); and/or (2) process values that cause an in specification final output to be unachievable. |

Experiential priors can also include acceptable and unacceptable manufacturing performance metrics. Manufacturing performance metrics calculate one or more aspects of multiple iterations of the manufacturing process (e.g., production volume for a specified time period, production downtime for a specified time period, resources used for a specified time period or a specified number of final outputs, percentage of products not in specification for a specified time period, production volume for a particular operator, material costs associated with a specified number of final outputs).

Universal inputs, as used herein, refers to a value that is not specific to a particular process station, but rather to an aspect of the entire manufacturing process, for example, a date, time of day, ambient temperature, humidity or other environmental conditions that might impact the manufacturing process, operator, level of skill of the operator, raw materials used in the process, raw material specifications such as color, viscosity, particle size, among other characteristics that are specific to the raw material, specific lot numbers and cost of raw materials, tenure of the equipment/tools for each station, identifying information such as production work order numbers, batch numbers, lot numbers, finished product numbers and finished product serial numbers.

Note, that the examples provided for each of functional priors, experiential priors and universal inputs represent one way to classify these examples, other suitable classifications can be used. For example, another way to classify the input that is provided to deep learning processor 118 is: pre-process inputs (e.g., experiential priors, functional priors, material properties, scheduling requirements); in-process inputs (e.g., universal inputs, control values, station values, intermediate values, final output values, process values); post-process inputs (e.g., manufacturing performance metrics and other analytics). Further, the functional and experiential priors can be dynamically updated throughout the manufacturing process.

Each process station can be controlled by one or more associated station controllers (e.g., station controller 120 controls process station 122 and station controller 140 controls process station 142). In an embodiment, a single station controller can control multiple process stations or control multiple control values associated with a single process station. In some embodiments, deep learning processor 118 can provide control inputs (represented by 126 and 146) based on predictive process control or pre-programmed algorithms to each process station controller. Predictive process control is described in U.S. patent application Ser. No. 16/663,245 entitled "Predictive Process Control for a Manufacturing Process," which is hereby incorporated by reference herein in its entirety. In other embodiments, the deep learning processor does not provide any inputs to the station controller.

A signal conditioner 190 and 191, for example a signal splitter, amplifier, digital to analog converter, analog to digital converter can be included to divide the control value signals so that the control values are sent both to deep learning processor 118 and the relevant station controller (e.g., 120 or 140). The control values can be analog or digital signals. Further, a signal conditioner, according to some embodiments, can be included within deep learning processor and can convert all analog values to digital values or perform other conditioning. Each station controller can provide one or more control signals (e.g., 121 and 141) that provides commands for regulating a station's control values (e.g., control values 125 and 145). Each station outputs an intermediate output (e.g., 124 and 144), that has an intermediate output value (134a and 144a respectively). All intermediate output values and the final output value (e.g., 144, if process station 142 is the final process station in the process) from the processing stations are provided to deep learning processor 118. Each station also outputs station values (e.g., 128 and 148) that can be provided to deep learning processor 118. FIG. 1 also illustrates that intermediate output 124 is sent (step 150) to one or more subsequent stations, which can represent a single station or any number of multiple stations. Station 142, as shown in FIG. 1, can receive (step 160) an intermediate input from any number of prior stations. In some embodiments, the setpoint values used by the station controllers (e.g., controllers 120 and 140) can be sent to deep learning controller 118. Further, values relating to the manufacturing process can be measured by independent sensors (e.g., independent sensor 127 and 137) and provided to deep learning controller 118.

It is understood that the communication among deep learning processor 118, the station controllers and process stations can use any suitable communication technologies that provide the ability to communicate with one or more other devices, and/or to transact data with a computer network. By way of example, implemented communication technologies can include, but are not limited to: analog technologies (e.g., relay logic), digital technologies (e.g., RS232, ethernet, or wireless), network technologies e.g., local area network (LAN), a wide area network (WAN), the Internet, Bluetooth technologies, Nearfield communication technologies, Secure RF technologies, and/or any other suitable communication technologies.

In some embodiments, operator inputs can be communicated to deep learning processor 118, and/or any of the station controllers or process stations using any suitable input device (e.g., keyboard, mouse, joystick, touch, touchscreen, etc.).

Figure 2:
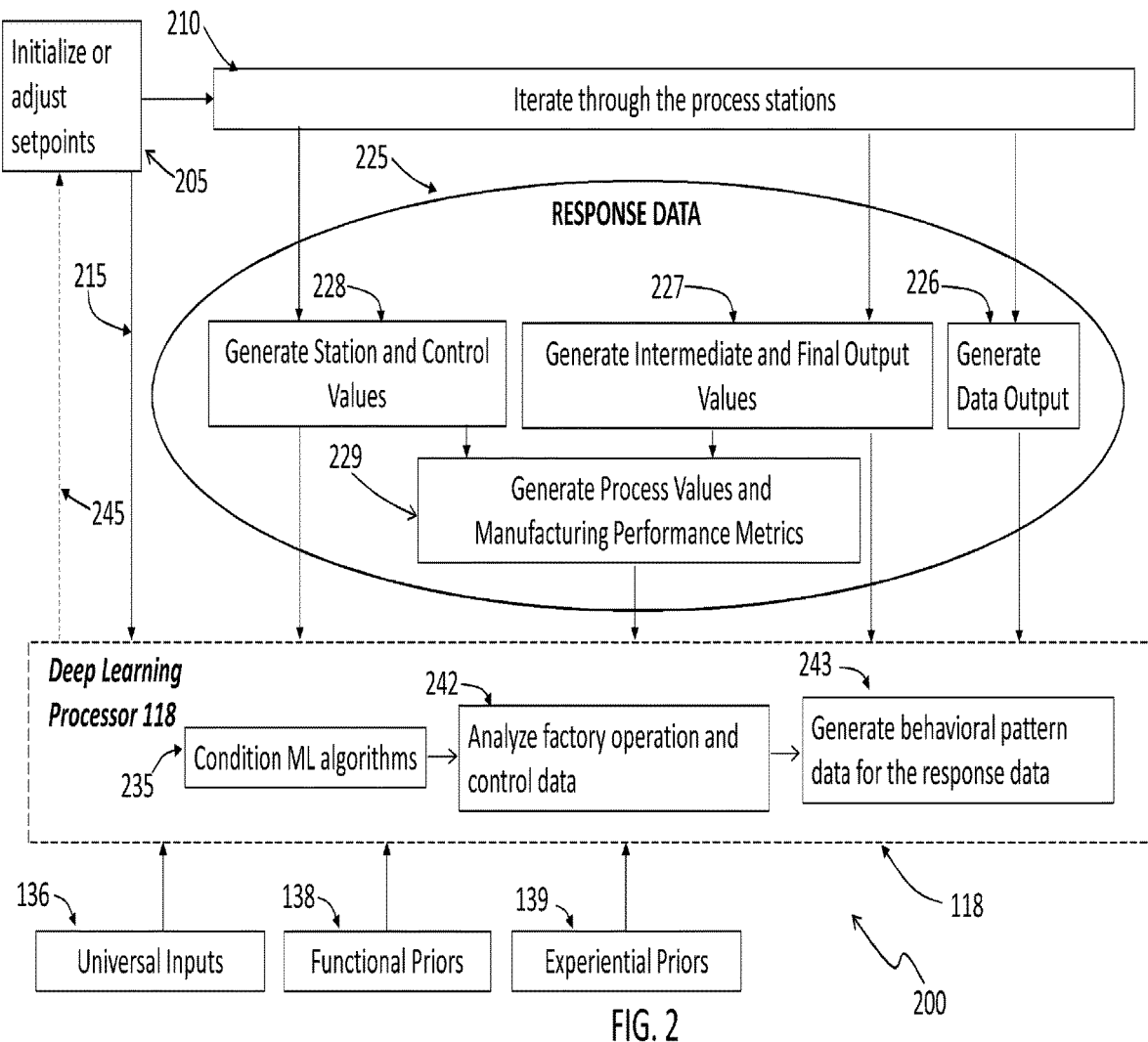
FIG. 2 shows an example method for training a deep learning processor.

FIG. 2 provides a method 200 for conditioning (training) a deep learning processor 118, according to some embodiments of the disclosed subject matter. The method 200 may be performed by a control system or other computing system that may provide hardware and/or software configured to implement the deep learning processor 118.

In step 205, the setpoints, algorithms and other control inputs for each station controller in a manufacturing process can be initialized using conventional control methods. Further, the control algorithms/operator can provide initial control or station values. The control algorithms, initial setpoint values, and initial control or station values can be provided to deep learning processor 118 (step 215) In other embodiments, the setpoints, algorithms and other control inputs for each station controller in a manufacturing process can be provided to the station controller using predictive process control (step 245), as described in U.S. patent application Ser. No. 16/663,245 "Predictive Process Control for a Manufacturing Process." It should be noted that control values, control algorithms, setpoints and any other information (e.g., process timing, equipment instructions, alarm alerts, emergency stops) provided to a station controller may be referred to collectively as "station controller inputs" or "control inputs." Further, other inputs, like functional priors 138, experiential priors 139 and universal inputs 136 can be provided to deep learning processor 118.

In step 210, the manufacturing process iterates through all the process stations for a predetermined time period using conventional or predictive process control methods. As discussed above, the process stations discussed herein can operate in series or in parallel. Further, a single station can perform: a single process step multiple times (sequentially or non-sequentially), or different process steps (sequentially or non-sequentially) for a single iteration of a manufacturing process. The process stations generate intermediate outputs, or a final output if it is a final station. The intermediate output is transmitted to subsequent (downstream) station(s) in the manufacturing process until a final output is generated. In further embodiments, the manufacturing of components for a final output can be asynchronous and geographically disperse. In other words, components for a final output can be manufactured at any time or any place, not necessarily at a time or place proximate to assembling the components into a final output. For example, the headlights of a car can be manufactured months before a car with the headlights is assembled.

As the process iterates through each station, all the values associated with: an individual station (e.g., control values); an output of an individual station (e.g., station values, intermediate/final output values, data output), or multiple stations (e.g., process values) are measured or calculated and provided to condition the machine learning algorithms of deep learning processor 118 (steps 227, 228, 229).

In some embodiments, manufacturing performance metrics (e.g., production volume for a specified time period, production downtime for a specified time period, resources used for a specified time period or a specified number of final outputs, percentage of products not in specification for a specified time period, production volume for a particular operator, material costs associated with a specified number of final outputs) for the manufacturing process under conventional control can be calculated and provided to deep learning processor 118 (step 229).

Although not shown, any actions taken (or control signals generated) by the station controller in response to a received control value or other control input from a process station can be provided to deep learning processor 118. Such actions can include adjusting temperature, speed, etc.

Note all inputs to deep learning processor 118 can be entered electronically or via manual means by an operator.

The conditioning of the machine learning models of deep learning processor 118 (step 235) can be achieved through unsupervised learning methods. Other than functional priors 138, experiential priors 139, universal inputs 136 that are input into deep learning processor 118, deep learning processor 118 draws inferences simply by analyzing the received data that it collects during the iteration of the manufacturing process (e.g., steps 228 and 229). In other embodiments, deep learning processor 118 can be conditioned via supervised learning methods, or a combination of supervised and unsupervised methods or similar machine learning methods. Further, the training of deep learning processor 118 can be augmented by: providing deep learning processor 118 with simulated data or data from a similar manufacturing process. In one embodiment, deep learning processor 118 can be conditioned by implementing deep learning processor 118 into a similar manufacturing process and fine-tuning the deep learning processor during implementation in the target manufacturing process. That is, training of deep learning processor 118 can be performed using a training process that is performed before deep learning processor 118 is deployed into a target manufacturing environment.

The conditioning of the machine learning models of deep learning processor 118 can include analyzing factory operation and control data for each setpoint used to regulate a particular control value for an identified processing station. The factory operation and control data can include the following: (i) the particular control value that corresponds to the setpoint; (ii) the other control values (and their corresponding setpoints) generated by the identified process station; (iii) the station values generated by the identified processing station; (iv) the intermediate output values generated by the identified processing station; (v) the control values (and their corresponding setpoints), station values, intermediate and final outputs generated by other process stations; (vi) universal inputs, functional priors, experiential priors; (vii) the control signals and other instructions provided to each processing stations; (viii) data output; (ix) measured values relating to factory control and operation received from independent sensors. Independent sensors can refer to sensors that provide measurements, beyond the sensors included in the normal manufacturing process. Since independent sensors are not part of the normal manufacturing process, they are often protected from malware penetration. In some embodiments, these independent sensors are not directly tied to a single machine or process step and can be fluidly used to measure values from any machine or process step (e.g., a handheld device that randomly takes measurements during the manufacturing process). In some embodiments, independent sensors can provide its outputted values to a coupled monitor, in addition to, or instead of, a deep learning processor 118. Values provided exclusively to a monitor, can be input manually into deep learning processor 118, according to some embodiments. Deep learning processor 118 can analyze factory operation and control data (step 242) to generate or learn behavioral patterns for response data generated at different setpoints (step 243).

Behavioral patterns among the response data, in a single station and across stations, for a single point in time or over a period of time, can include: positive correlations; negative correlations; frequency; amplitude; upward or downward trends; a rate of change for each control value or stations value; for an identified response data, other response data that will or will not be affected if the identified response data changes. Response data 225 includes not only the control value associated with a particular set point for an identified process stations, but one or more of the following data types: (i) control values associated with other set points for the identified process station; (ii) station values associated with the identified process station; (iii) intermediate output values associated with the identified process station; (iv) control values associated with other process stations; (v) station values associated with other process stations; (vi) intermediate output values associated with other process station; (vii) final output value; (viii) data output; (ix) measured values relating to factory control and operation received from independent sensors.

Note, data is usually collected from sensors at a predefined rate. The frequency analysis can take into account this rate and adjust its output value accordingly, so that the output value reflects the true frequency rate, and does not reflect a rate that includes the time it takes to collect data from the sensors. In some embodiments, the frequency analysis can also show rapid changes in a control value after a rise or fall and a brief stabilization period. The stabilization period can be so brief that it is barely detectable. This can be an example of an attack. Instead of a control value stabilizing at a high or at a low point, a malicious signal can be provided to keep increasing or decreasing the control value beyond an acceptable high or low. By increasing or decreasing shortly after stabilization, the attack can seem normal and consistent with the control value's prior increase or decrease.

To create a robust data set for the conditioning of the machine learning models, setpoints (or other control inputs) corresponding to each control value of each process station can be adjusted for every value (or a subset of values) that will yield in-specification final outputs. Further, any number and any combination of setpoints can be adjusted for training purposes (step 205). The setpoints (or other control inputs) can be adjusted manually, by pre-programmed algorithms, or by predictive process control.

In some embodiments, one or more setpoints (or other control inputs) can be adjusted to values that will occur during known factory disruptions (e.g., wear and tear of a machine, insertion of a wrong component), unrelated to malware attacks, even if those values yield final outputs that are not in-specification.

In some embodiments, deep learning processor 118 can be implemented along with conventional standard process control systems associated with the operation and control of a factory process. Instead of using all the data associated with the operation and control of a factory process, deep learning processor 118 can train its machine learning algorithms using the same data that is provided to any standard process control system used in the operation and control of a factory process.

For each setpoint adjustment or set of setpoint adjustments, the manufacturing process can iterate through the process stations for a predetermined time period (step 210) and provide setpoints (step 215), generate station and control values (step 228), generate intermediate and final output values (step 227), generate data output (step 226), generate process values and manufacturing performance metrics (step 229) to the deep learning processor 118. Deep learning processor 118 can analyze factory operation and control data (step 242) associated with the robust data set to generate or learn behavioral pattern data for the response data (step 243).

In some embodiments, the manufacturing process can iterate through the process stations for a predetermined time period.

Figure 3:
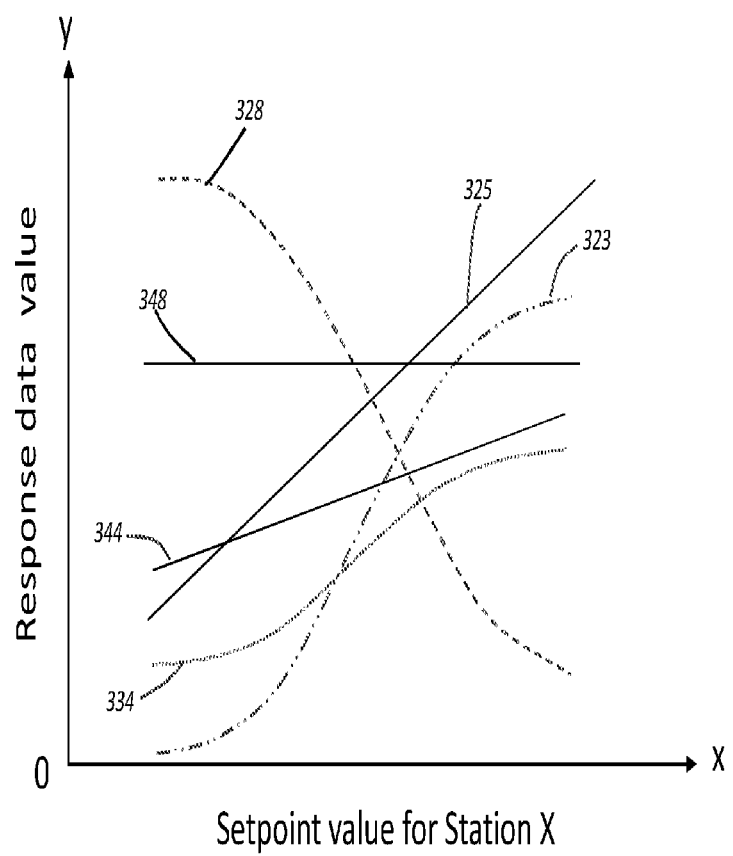
FIG. 3 shows an example behavioral pattern for a subset of response data generated by the operation and control of factory processes, equipment and automated systems.

An example behavioral pattern 300 for a subset of response data is shown, for example, in FIG. 3. The x-axis represents a setpoint value for station X, and the y-axis represents the response data value. The different lines shown in the graph 302 represent the normal behavioral pattern of the response data for values associated with station X, as well as the behavioral pattern of the response data for values associated with another station, station Y. In this example, the setpoint that is increasing along the x-axis represents speed. The response data that is shown in the graph 302 include control value 325 (i.e., representing speed) that is associated with the increasing setpoint. Also shown is independent control value 323, which can represent, for example, power. Other values shown for station X include: station value 328, which can represent viscosity, and intermediate output value 334, which can represent diameter. In addition, values associated with station Y, are also shown, and include station value 348, which can represent temperature, and final output value 344, which can represent weight. FIG. 3 shows the amplitude of each response. It also shows how the response data behaves when setpoint for speed is increased: power (as represented by 323) at the station increases, diameter (as represented by 334) increases, temperature at station Y stays the same, viscosity (as represented by 328) decreases, and weight (as represented by 344) increases. Behavioral patterns can be quite complex, involving thousands of data points, and identifying unusual behavioral patterns cannot be performed by human calculation. Therefore, machine learning analysis is needed to generate or learn behavioral patterns for the response data and to analyze those behavioral patterns for anomalous activity.

Figure 4:
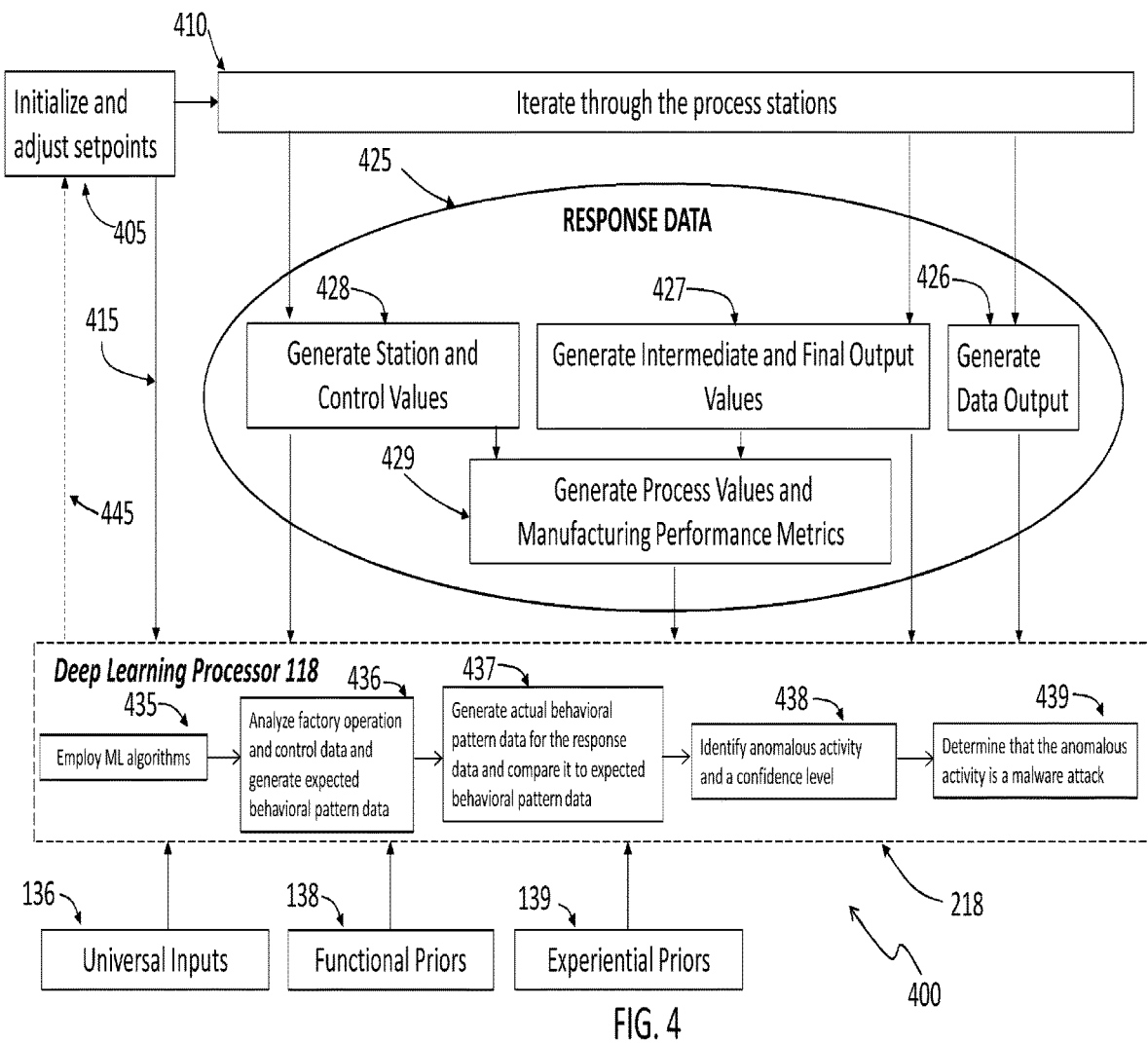
FIG. 4 shows an example method for monitoring the operation and control of a factory process using a trained deep learning processor.

FIG. 4, shows an example method 400 for detecting anomalous activity during the manufacturing process in real time, or asynchronously, using the conditioned machine learning algorithms (as discussed in connection with FIG. 2)

Similar to FIG. 2, the setpoints of the process stations of a manufacturing process are initialized (step 405) and provided to deep learning processor 118. As the manufacturing process iterates through the process stations (step 410), response data 425 is generated and provided to deep learning processor 118 (steps 426, 427, 428 and 429, which parallel steps 226, 227, 228 and 229, described in connection with FIG. 2). Deep learning processor 118 employs its conditioned machine learning algorithms (step 435) to analyze the factory operation and control data and predict expected behavioral pattern data (step 436). The machine learning algorithms can generate or learn actual behavioral pattern data for the received response data and compare the generated behavioral pattern data or learned behavioral pattern data with the expected behavioral pattern data (step 437), and identify anomalous activity and a confidence level associated with the anomalous activity (step 438). In some aspects, the confidence level may be expressed as a numerical probability of accuracy for the prediction, in other aspects, the confidence level may be expressed as an interval or probability range.

An operator or algorithm can assign thresholds to the confidence levels associated with anomalous activities, as well as predefined actions to be performed when a threshold is met. For example, for the anomalous activities receiving a high confidence level score, immediate action can be prescribed, whereas with anomalous activities receiving lower confidence level scores, an operator can be prompted to review the anomalous activity before an action is taken. In one embodiment, the confidence levels can be divided into three intervals: high, medium and low, and a threshold can be assigned to each interval. Further, actions to be performed can be assigned to each interval. For example, for high confidence levels that fall into the high confidence interval an alert can be generated, for confidence levels that fall into the medium confidence interval, an operator can be prompted to review the anomalous activity, for confidence levels that fall into the low confidence level interval, the anomalous activity can be flagged and sporadically checked. The thresholds and interval ranges can be reviewed and adjusted to minimize false positives or false negatives.

In some embodiments, in real-time, during operation of the manufacturing process, or asynchronously, the conditioned machine learning algorithms can detect among the thousands of data points generated during the manufacturing process, at a single station or across stations, for a single point in time or over a period of time, whether there are any unusual: correlation patterns; frequency patterns; amplitude patterns; upward or downward trends; rate of change for a control value or station value. In some embodiments, the behavioral pattern of actual response data can be compared to the expected behavioral pattern for expected response data with respect to the nominal setpoint values and the behavioral data in the frequency domain. The deep learning controller can analyze not just the static statistical representation but focus on the response of the system to a planned or unplanned change in the set point value and directly compare that to expected performance, as compounded during the training phase through the entire operational life cycle of the system.

Further, deep learning processor 118 can determine whether or not the anomalous activity is a malware attack. For example, when behavioral pattern data indicates significant, sudden, rapid or unexpected changes in the response data that is different from the expected behavioral data. In one embodiment, deep learning processor 118 can analyze whether the behavioral pattern data is consistent with behavioral pattern data for known disruptive activity that is not a malware attack. In some embodiments deep learning processor 118 uses data output generated during the manufacturing process and/or data from data logging module 510 to determine whether the anomalous activity was caused by an attack or by some other failure (e.g., the material used was defective, a faulty component was installed).

Figure 6:
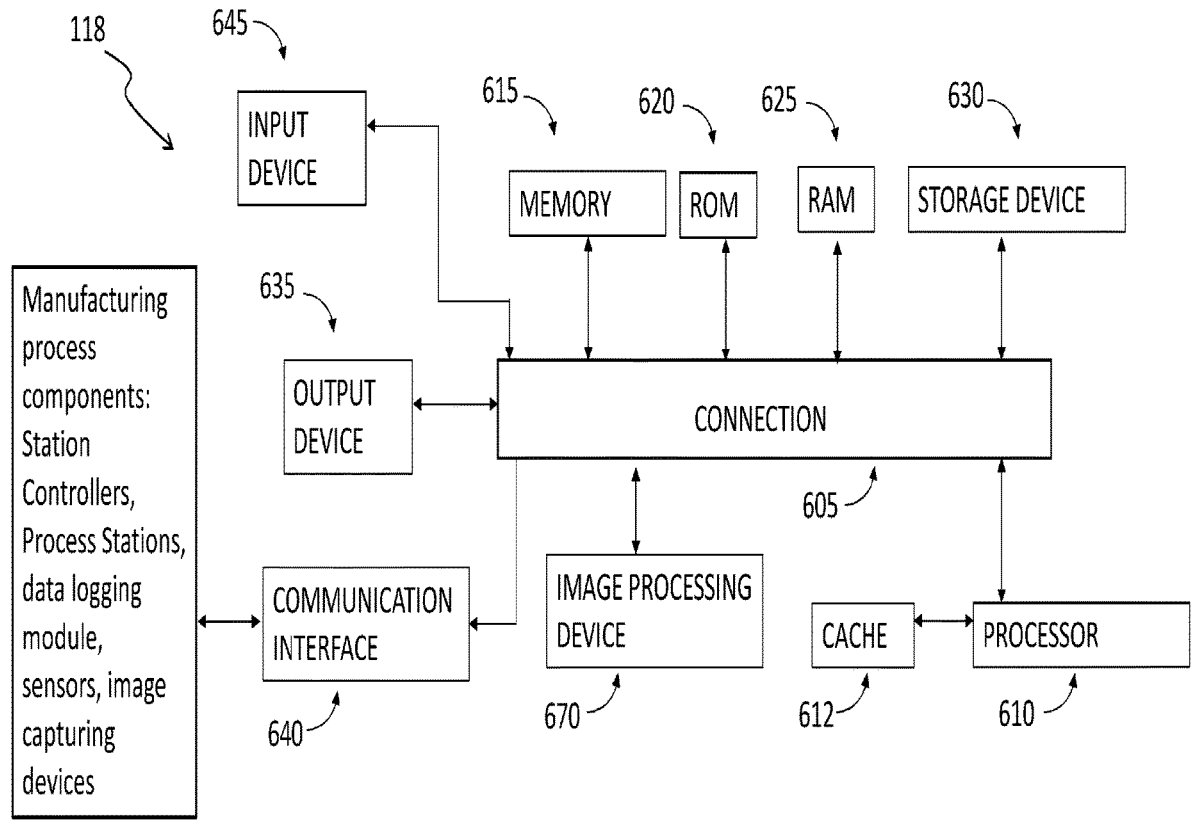
FIG. 6 shows an illustrative example of a computing system architecture including various components in electrical communication with each other using a connection in accordance with various embodiments.

In some embodiments, deep learning processor 118 can be configured to communicate with existing IT security systems to notify the systems of the anomalous activity. In further embodiments, deep learning processor 118 can be configured to communicate with a data logging module, as shown in FIG. 6. This communication can provide alerts specifying the exact source of the malware attack and also be used to reconfigure firewall and other IT infrastructure to better defend the factory processes and equipment.

In some embodiments, deep learning processor 118 can be configured to communicate with the supply chain management system to alert a procurement or manufacturing source of an infected process component.

In some embodiments, deep learning processor 118 can be configured to communicate with the station or component that is the source for the anomalous activity and instruct the station or component to generate an alert via a coupled display or media system (e.g., a sound alert) that identifies the existence of anomalous activity, the source for the anomalous activity and/or the type of anomalous activity.

In some embodiments, deep learning processor 118 can be implemented along with conventional standard process control systems. Instead of analyzing all the data associated with the operation and control of a factory process for anomalous activity, deep learning processor can receive the same data that is provided to any standard process control systems used in the operation and control of a factory process, and only analyze that data for anomalous activity.

Figure 5:
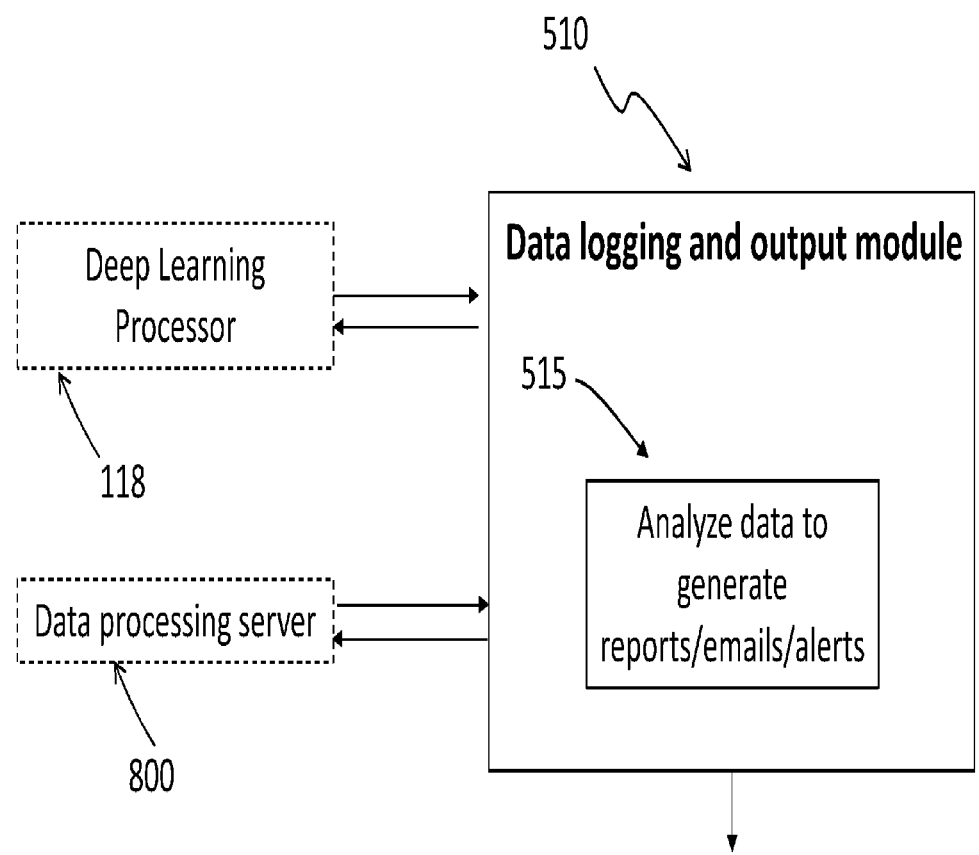
FIG. 5 shows an example method for logging and creating data alerts.

FIG. 5 shows an example data logging and output module 510 that can be configured to receive data from deep learning processor 118, and data processing server 800 to analyze the data and to generate reports, emails, alerts, log files or other data compilations (step 515). For example, data logging module 510 can be programmed to search the received data for predefined triggering events, and to generate reports, emails, alerts, log files, updates to a monitoring dashboard, or other data compilations showing relevant data associated with those triggering events (step 515). For example, identification of anomalous activity can be defined as a triggering event and the following data can be reported: behavioral pattern for the response data compared to the expected behavioral pattern, the station(s), controller(s) or sensor(s) that were impacted by the anomalous activity, the sensor(s) that generated the triggering event, identification of the specific response data that is unexpected, date and time of day that the anomalous activity occurred, the confidence level associated with the triggering event, the impact of the anomalous activity on other stations and the intermediate or final output. Other suitable triggers can be defined, and other suitable data can be reported. In some embodiments, data logging module 510 can be included within deep learning processor 118. In some embodiments, data from the data logging module can be provided to deep learning processor 118 as part of the response data, as discussed in connection with FIGS. 2 and 4.

In some embodiments, it is useful to identify what parameters of the manufacturing process most impact the final output value or the process performance (the "key influencers"). The deep learning processor 118 can consider all parameters of the manufacturing process (e.g., one or more control values, one or more station values, one or more process values, one or more stations, one or more intermediate outputs, experiential priors (e.g., root cause analysis for defects or failures in final outputs for the manufacturing process and solutions), functional priors, universal inputs or any combination thereof), and using one or more of its machine learning algorithms can identify the key influencers. In some aspects, deep learning processor 118 can employ unsupervised machine learning techniques to discover one or more key influencers, for example, wherein each key influencer is associated with one or more parameters (or parameter combinations) that affect characteristics of various station outputs, the final output, and/or process performance. It is understood that discovery of key influencers and their associated parameters may be performed through operation and training of deep learning processor 118, without the need to explicitly label, identify or otherwise output key influencers or parameters to a human operator.

In some approaches, deep learning processor 118, using its machine learning models, can rank or otherwise generate an ordering of, in order of significance, the impact of each parameter of the manufacturing process on the final output value or the process performance. A key influencer can be identified based on: a cutoff ranking (e.g., the top 5 aspects of the manufacturing process that impact the final output value), a minimum level of influence (e.g., all aspects of the manufacturing process that contribute at least 25% to the final output value); critical process stations or operations that malware is likely to target; or any other suitable criteria. In some aspects, key influence characteristics may be associated with a quantitative score, for example, that is relative to the weight of influence for the corresponding characteristic.

Deep learning processor 118 can continuously, throughout the manufacturing process, calculate and refine the key influencers. The key influencers can be used to help build a more robust data set to train deep learning processor 118. Instead of varying every single control input in the manufacturing process to generate a robust data set, or an arbitrary subset of control inputs, deep learning process 118 can vary only the control inputs (e.g., setpoints) associated with the key influencers to generate a robust data set. In further embodiments, deep learning processor 118 can use the key influencers to identify which stations and response data to monitor, to detect anomalous activity. Identifying key influencers is further described in U.S. patent application Ser. No. 16/663,245 "Predictive Process Control for a Manufacturing Process." FIG. 6 shows the general configuration of an embodiment of deep learning processor 118 that can implement dynamic monitoring and securing of factory processes, equipment and automated systems, in accordance with some embodiments of the disclosed subject matter. Although deep learning processor 118 is illustrated as a localized computing system in which various components are coupled via a bus 605, it is understood that various components and functional computational units (modules) can be implemented as separate physical or virtual systems. For example, one or more components and/or modules can be implemented in physically separate and remote devices, such as, using virtual processes (e.g., virtual machines or containers) instantiated in a cloud environment.

Deep learning processor 118 can include a processing unit (e.g., CPU/s and/or processor/s) 610 and bus 605 that couples various system components including system memory 615, such as read only memory (ROM) 620 and random access memory (RAM) 625, to processing unit 610. Processing unit 610 can include one or more processors such as a processor from the Motorola family of microprocessors or the MIPS family of microprocessors. In an alternative embodiment, the processing unit 610 can be specially designed hardware for controlling the operations of deep learning processor 118 and performing predictive process control. When acting under the control of appropriate software or firmware, processing module 610 can perform various machine learning algorithms and computations described herein.

Memory 615 can include various memory types with different performance. characteristics, such as memory cache 612. Processor 610 can be coupled to storage device 630, which can be configured to store software and instructions necessary for implementing one or more functional modules and/or database systems. Each of these modules and/or database systems can be configured to control processor 610 as well as a special-purpose processor where software instructions are incorporated into the actual processor design.

To enable operator interaction with deep learning processor 118, input device 645 can represent any number of input mechanisms, such as a microphone for speech, a touch-sensitive screen for gesture or graphical input, keyboard, mouse, motion input and so forth. An output device 635 can also be one or more of a number of output mechanisms (e.g., printer, monitor) known to those of skill in the art. In some instances, multimodal systems can enable an operator to provide multiple types of input to communicate with deep learning processor 118. Communications interface 640 can generally govern and manage the operator input and system output, as well as all electronic input received from and sent to other components that are part of a manufacturing process such as the station controllers, process stations, data logging module, and all associated sensors and image capturing devices. There is no restriction on operating on any particular hardware arrangement and therefore the basic features here may easily be substituted for improved hardware or firmware arrangements as they are developed. Data output from deep controller 118 can be displayed visually, printed, or generated in file form and stored in storage device 630 or transmitted to other components for further processing.

Communication interface 640 can be provided as interface cards (sometimes referred to as "line cards"). Generally, they control the sending and receiving of data packets over the network and sometimes support other peripherals used with the router. Among the interfaces that can be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow processing unit 610 to efficiently perform machine learning and other computations necessary to implement predictive process control. Communication interface 640 can be configured to communicate with the other components that are part of a manufacturing process such as the station controllers, process stations, data logging module, and all associated sensors and image capturing devices.

In some embodiments, deep learning processor 118 can include an imaging processing device 670 that processes images received by various image capturing devices such as video cameras, that are coupled one or more processing station and are capable of monitoring and capturing images of intermediate and final outputs. These images can be transmitted to deep learning processor 118 via communication interface 640, and processed by image processing device 670. The images can be processed to provide data, such as number and type of defects, output dimensions, throughput, that can be used by deep learning processor 118 to compute intermediate and final output values. In some embodiments, the image processing device can be external to deep learning processor 118 and provide information to deep learning processor 118 via communication interface 640.

Storage device 630 is a non-transitory memory and can be a hard disk or other types of computer readable media that can store data accessible by a computer, such as magnetic cassettes, flash memory cards, solid state memory devices, digital versatile disks, cartridges, random access memories (RAMs) 625, read only memory (ROM) 620, and hybrids thereof.

In practice, storage device 630 can be configured to receive, store and update input data to and output data from deep learning processor 118, for example functional priors, experiential priors, universal input; pre-process inputs; in-process inputs and post-process inputs.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, etc.), non-transitory optical media (such as compact discs, digital video discs, Blu-ray discs, etc.), non-transitory semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, and any suitable media that is fleeting and devoid of any semblance of permanence during transmission, and/or any suitable intangible media.

The various systems, methods, and computer readable media described herein can be implemented as part of a cloud network environment. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. The cloud can provide various cloud computing services via cloud elements, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. A person of ordinary skill in the art would understand that the term mechanism can encompass hardware, software, firmware, or any suitable combination thereof.

Unless specifically stated otherwise as apparent from the above discussion, it is appreciated that throughout the description, discussions utilizing terms such as "determining," "providing," "identifying," "comparing" or the like, refer to the action and processes of a computer system, or similar electronic computing device, that manipulates and transforms data represented as physical (electronic) quantities within the computer system memories or registers or other such information storage, transmission or display devices. Certain aspects of the present disclosure include process steps and instructions described herein in the form of an algorithm. It should be noted that the process steps and instructions of the present disclosure could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of non-transient computer-readable storage medium suitable for storing electronic instructions. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps and system-related actions. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system can practice all or part of the recited methods, can be a part of the recited systems, and/or can operate according to instructions in the recited non-transitory computer-readable storage media. Such logical operations can be implemented as modules configured to control the processor to perform particular functions according to the programming of the module.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. The apparatus, method and system for dynamic monitoring and securing of factory processes, equipment and automated systems have been described in detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

The invention claimed is:

1. A manufacturing system, comprising:
   two or more process stations, wherein a first process station is logically positioned upstream of a second process station, wherein each of the first process station and the second process station is configured to perform a step of a multi-step manufacturing process;
   a first station controller programmed to control a first operation of the first process station;
   a second station controller programmed to control a second operation of the second process station;
   a deep learning controller in communication with the two or more process stations, the first station controller, and the second station controller, wherein the deep learning controller is trained to identify anomalous activity in the multi-step manufacturing process based on response data received from the first station controller or the second station controller; and
   a signal splitter positioned between the first station controller and the deep learning controller, the signal splitter having a single input, a first output, and a second output, wherein the signal splitter is configured to receive a control value signal output from the first process station via the single input, divide the control value signal output, provide a first instance of the divided control value signal output to the first station controller via the first output and, provide a second instance of the divided control value signal output to the deep learning controller via the second output.

2. The manufacturing system of claim 1, further comprising:
   a second signal splitter positioned between the second station controller and the deep learning controller, the second signal splitter having a further single input, a further first output, and a further second output, wherein the second signal splitter is configured to receive a second control value signal output from the second process station via the further single input, divide the second control value signal output, provide a first instance of the second divided control value signal output to the second station controller via the further first output, and provide a second instance of the second divided control value signal output to the deep learning controller via the further second output.

3. The manufacturing system of claim 1, further comprising:
   training the deep learning controller to identify anomalous activity in the multi-step manufacturing process based on expected behavioral patterns and actual behavior patterns.

4. The manufacturing system of claim 3, further comprising:
   generating a training data set comprising at least one set of actual behavioral patterns comprising unusual frequency patterns.

5. The manufacturing system of claim 2, wherein the signal splitter is configured to send a first control value signal to the first station controller, wherein the first control value signal is an analog or digital signal, and wherein the second signal splitter is configured to send a second control value signal to the second station controller, wherein the second control value signal is an analog or digital signal.

6. The manufacturing system of claim 1, wherein the deep learning controller is configured to receive the response data from the first process station and determine whether the response data comprises anomalous activity.

7. The manufacturing system of claim 6, wherein the deep learning controller is configured to generate a signal indicating that the anomalous activity is identified.

8. A manufacturing system, comprising:
   a process station configured to perform a step of a multi-step manufacturing process;
   a station controller programmed to control an operation of the process station;
   a deep learning controller in communication with the process station and the station controller, wherein the deep learning controller is trained to identify anomalous activity in the multi-step manufacturing process based on response data received from the station controller; and
   a signal splitter positioned between the station controller and the deep learning controller, the signal splitter having a single input, a first output, and a second output, wherein the signal splitter is configured to receive a control value signal output from the process station via the single input, divide the control value signal output, provide a first instance of the divided control value signal output to the station controller via the first output, and provide a second instance of the divided control value signal output to the deep learning controller via the second output.

9. The manufacturing system of claim 8, further comprising:
   a second process station positioned downstream of the process station;
   a second station controller programmed to control a second operation of the second process station; and
   a second signal splitter positioned between the second station controller and the deep learning controller, the second signal splitter having a further single input, a further first output, and a further second output, wherein the second signal splitter is configured to receive a second control value signal output from the second process station via the single input, divide the second control value signal output, provide a first instance of the divided second control value signal output to the second station controller via the further first output, and provide a second instance of the divided second control value signal output to the deep learning controller via the further second output.

10. The manufacturing system of claim 8, further comprising:
training the deep learning controller to identify anomalous activity in the multi-step manufacturing process based on expected behavioral patterns and actual behavior patterns.

11. The manufacturing system of claim 10, further comprising:
generating a training data set comprising at least one set of actual behavioral patterns comprising unusual frequency patterns.

12. The manufacturing system of claim 9, wherein the signal splitter is configured to send a first control value signal to the station controller, wherein the first control value signal is an analog or digital signal, and wherein the second signal splitter is configured to send a second control value signal to the second station controller, wherein the second control value signal is an analog or digital signal.

13. The manufacturing system of claim 8, wherein the deep learning controller is configured to receive response data from the process station and determine whether the response data comprises anomalous activity.

14. The manufacturing system of claim 13, wherein the deep learning controller is configured to generate a signal indicating that the anomalous activity is identified.

15. A computer-implemented method, comprising:
receiving, at a single input of a signal splitter, a control value signal output from a process station involved in a multi-step manufacturing process;
splitting, by the signal splitter, the control value signal output from the process station;
providing, by the signal splitter via a first output of the signal splitter, a first instance of the split control value signal output to a deep learning controller trained to identify anomalous activity in the multi-step manufacturing process based on response data;
providing, by the signal splitter via a second output of the signal splitter, a second divided control value signal output to a station controller associated with the process station;
generating, by the deep learning controller, an expected behavioral pattern data and an actual behavioral pattern based at least in part on the first instance of the split control value signal output;
detecting, by the deep learning controller, based on an evaluation of the expected behavioral pattern data and the actual behavioral pattern data, anomalous activity in the manufacturing process, by identifying an unusual frequency pattern in the actual behavioral pattern data in relation to the expected behavioral pattern data; and
providing an indication of the anomalous activity as a result of detection of the anomalous activity in the multi-step manufacturing process.

16. The computer-implemented method of claim 15, further comprising:
receiving, by a second signal splitter via a further single input, a second control value signal output from a second process station involved in the multi-step manufacturing process;
splitting, by a second signal splitter, the second control value signal output from the second process station;
providing, by the second signal splitter via a further first output of the second signal splitter, a first instance of the second split control value signal output to the deep learning controller trained to identify anomalous activity in the multi-step manufacturing process based on the second control value signal output; and
providing, by the second signal splitter via a further second output of the second signal splitter, a second instance of the second split control value signal output to the second station controller.

17. The computer-implemented method of claim 15, further comprising:
training the deep learning controller to predict expected behavioral patterns; and
training the deep learning controller to generate actual behavioral patterns.

18. The computer-implemented method of claim 17, further comprising:
training the deep learning controller to identify anomalous activity in the manufacturing process based on the expected behavioral patterns and the actual behavioral patterns.

19. The computer-implemented method of claim 15, wherein first divided control value signal is an analog or digital signal and the second control value signal is an analog or digital signal.

20. The computer-implemented method of claim 15, wherein the deep learning controller is trained based on a training data set comprising at least one set of actual behavioral patterns comprising unusual frequency patterns.

* * * * *